US007003390B2

(12) United States Patent
Kaga

(10) Patent No.: US 7,003,390 B2
(45) Date of Patent: Feb. 21, 2006

(54) CONTROL DEVICE OF INTERNAL COMBUSTION ENGINE

(75) Inventor: Tomoyuki Kaga, Lafayette, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/938,883

(22) Filed: Sep. 13, 2004

(65) Prior Publication Data

US 2005/0065707 A1 Mar. 24, 2005

(30) Foreign Application Priority Data

Sep. 19, 2003 (JP) ............................ 2003-327965

(51) Int. Cl.
*B60T 7/12* (2006.01)

(52) U.S. Cl. ...................................... 701/101; 701/103

(58) Field of Classification Search ................ 701/101, 701/102, 103, 104, 112
See application file for complete search history.

(56) References Cited

U.S. PATENT DOCUMENTS

| | | | | |
|---|---|---|---|---|
| 6,089,206 | A * | 7/2000 | Suzuki et al. | 123/295 |
| 6,612,292 | B1 * | 9/2003 | Shirakawa | 123/501 |
| 2002/0124828 | A1 * | 9/2002 | Shirakawa | 123/299 |
| 2005/0022778 | A1 * | 2/2005 | Miura | 123/299 |

FOREIGN PATENT DOCUMENTS

| | | |
|---|---|---|
| JP | 2001-234798 | 8/2001 |
| JP | 2002-070633 | 3/2002 |

* cited by examiner

*Primary Examiner*—John T. Kwon
(74) *Attorney, Agent, or Firm*—Kenyon & Kenyon

(57) ABSTRACT

A control device of an internal combustion engine provided with throttle air passage calculating means for calculating an amount of throttle air passage through a throttle valve, excess air calculating means for calculating an amount of excess air to a cylinder corresponding to drop in air pressure in intake pipe due to an intake valve for that cylinder opening, cylinder air charge estimating means for estimating a cylinder air charge amount for each cylinder based on the amount of throttle air passage detected by the throttle air passage detecting means and an amount of excess air calculated by the excess air calculating means, and engine control means for controlling the internal combustion engine based on the cylinder air charge amount for each cylinder estimated by the cylinder air charge estimating means.

11 Claims, 14 Drawing Sheets mt : FLOW RATE OF GAS FLOWING INTO INTAKE PIPE (g/sec)
mci : FLOW RATE OF GAS FLOWING FROM INTAKE PIPE INTO EACH CYLINDER (g/sec)
Pm : AIR PRESSURE IN INTAKE PIPE (Pa)
Tm : AIR TEMPERATURE IN INTAKE PIPE (K)
Ra : CONSTANT RELATING TO GAS CONSTANT
Vm : VOLUME OF INTAKE PIPE PART ($m^3$)

Fig.19

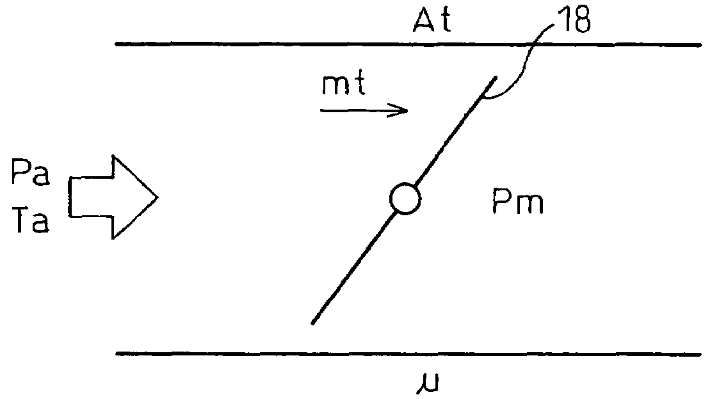

Pm: AIR PRESSURE IN INTAKE PIPE (kPa)
Pa: ATMOSPHERIC PRESSURE (kPa)
Ta: ATMOSPHERIC TEMPERATURE (K)
At: CROSS-SECTIONAL AREA OF OPENING OF THROTTLE VALVE ($m^2$)
mt: FLOW RATE OF AIR PASSING THROUGH THROTTLE VALVE (g/sec)
μ : FLOW RATE CONSTANT

Fig.20

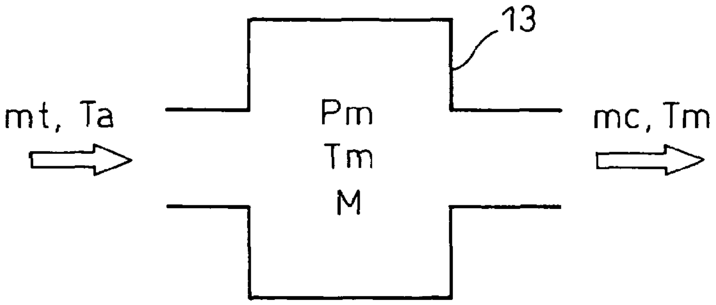

mt: FLOW RATE OF GAS FLOWING INTO INTAKE PIPE (g/sec)
mc: FLOW RATE OF GAS FLOWING FROM INTAKE PIPE (g/sec)
Pm: AIR PRESSURE IN INTAKE PIPE (kPa)
Ta: TEMPERATURE OF INFLOWING GAS (K)
Tm: AIR TEMPERATURE IN INTAKE PIPE (K)
M : TOTAL AMOUNT OF GAS IN INTAKE PIPE
R : GAS CONSTANT
Vm: INTAKE PIPE VOLUME ($m^3$)
Cp: CONSTANT PRESSURE SPECIFIC HEAT OF AIR
Cv: CONSTANT VOLUME SPECIFIC HEAT OF AIR
K : SPECIFIC HEAT RATIO Pm : PRESSURE UPSTREAM OF INTAKE VALVE (kPa)
Tm : TEMPERATURE UPSTREAM OF INTAKE VALVE (K)
Ta : ATMOSPHERIC TEMPERATURE (K)
mc : FLOW RATE OF GAS SUCKED INTO CYLINDER (g/sec)
a, b : COMPLIANCE PARAMETERS

CONTROL DEVICE OF INTERNAL COMBUSTION ENGINE

This application claims priority to Japanese Patent Application No. 2003-327965 filed 19 Sep. 2003, the content of which is incorporated herein by reference in its entirety.

BACKGROUND OF THE INVENTION

1. Field of the Invention

The present invention relates to a control device of an internal combustion engine.

2. Description of the Related Art

To optimize the air-fuel ratio of an air-fuel mixture burned in a combustion chamber of an internal combustion engine, it is necessary to accurately estimate the amount of air charged in the combustion chamber when the intake valve closes (hereinafter referred to as the "cylinder air charge amount"). Normally, the cylinder air charge amount is estimated from a large number of sensors such as a flow rate sensor (air flow meter) and a large number of maps using as arguments the outputs from these sensors. Here, if using maps to estimate the cylinder air charge amount, the necessary number of maps and the number of the arguments become great. Along with this, the steps for compliance at the time of preparing the maps end up becoming extremely great. Therefore, in recent years, the use of numerical calculation models expressed by equations based on fluid dynamics etc. has been studied so as to reduce the number of maps and the number of arguments to calculate the cylinder air charge amount.

Japanese Unexamined Patent Publication (Kokai) No. 2002-70633 describes a device for calculating the cylinder air charge amount using such numerical calculation models. The device of Japanese Unexamined Patent Publication (Kokai) No. 2002-70633 utilizes the fact that, from the law of the conservation of mass, the value of the amount of air flowing into an intake pipe minus the amount of air accumulated in the intake pipe is equal to the amount of air charged in the cylinder, in order to calculate the cylinder air charge amount. Specifically, it subtracts from the amount of throttle valve air passage detected by an air flow meter etc. the amount of change of the intake pipe air calculated based on the air pressure in intake pipe detected by a pressure sensor etc. and uses the result as the cylinder air charge amount.

By the way, since the intake valves corresponding to the cylinders successively open, pulsation occurs in the air pressure in intake pipe (intake pulsation). However, if the device of Japanese Unexamined Patent Publication (Kokai) No. 2002-70633 were to take into consideration the pulsation of the air pressure in intake pipe in calculating the cylinder air charge amount, the calculation would end up becoming complicated, so the actually occurring pulsation of the air pressure in intake pipe is ignored in calculating the cylinder air charge amount. That is, despite the fact that the air pressure in intake pipe actually changes greatly due to intake pulsation, the amount of change in the intake pipe air is calculated excluding the change in the air pressure in intake pipe due to pulsation by calculation.

However, in actuality, the pulsation of air pressure in intake pipe is closely related to the cylinder air charge amount for each cylinder. If it were possible to calculate the cylinder air charge amount utilizing this pulsation, it would be possible to calculate the cylinder air charge amount more accurately.

SUMMARY OF THE INVENTION

An object of the present invention is to provide a control device of an internal combustion engine able to easily estimate the cylinder air charge amount for each cylinder utilizing the pulsation of the air pressure in intake pipe and thereby optimally control the internal combustion engine.

In one embodiment of the present invention, there is provided a control device of an internal combustion engine provided with throttle air passage calculating means for calculating an amount of throttle air passage through a throttle valve, excess air calculating means for calculating an amount of excess air to a cylinder corresponding to a drop in air pressure in intake pipe due to an intake valve for that cylinder opening, cylinder air charge estimating means for estimating a cylinder air charge amount for each cylinder based on the amount of throttle air passage detected by the throttle air passage detecting means and an amount of excess air calculated by the excess air calculating means, and engine control means for controlling the internal combustion engine based on the cylinder air charge amount for each cylinder estimated by the cylinder air charge estimating means.

In another embodiment of the present invention, the cylinder air charge estimating means employs the total of the amount of throttle air passage and the amount of excess air to each cylinder as the cylinder air charge amount to each cylinder.

In another embodiment of the present invention, the cylinder air charge estimating means employs the total of the amount of throttle air passage and the amount of excess air to each cylinder averaged for each cylinder over a plurality of cycles as the cylinder air charge amount to each cylinder.

In another embodiment of the present invention, the device is provided with a pressure sensor for detecting an air pressure in intake pipe, and the excess air calculating means calculates the amount of excess air to each cylinder using a state equation based on a difference between a maximum value and a minimum value of the air pressure in intake pipe detected by the pressure sensor during the period when the intake valve corresponding to each cylinder is opened and a period near it and on the air temperature in intake pipe.

In another embodiment of the present invention, the device employs atmospheric temperature as the air temperature in intake pipe.

In another embodiment of the present invention, the excess air calculating means calculates the amount of excess air to each cylinder based on a drop in the air pressure in intake pipe due to the intake valve corresponding to each cylinder opening and a rise in the air pressure in intake pipe right before the intake valve corresponding to that cylinder opens or right after that intake valve closes.

In another embodiment of the present invention, the device is further provided with a flow rate sensor for detecting a throttle valve air passage flow rate through the throttle valve, and the throttle air passage calculating means calculates the amount of throttle air passage by integrating the throttle valve air passage flow rate detected by the flow rate sensor in the period between the maximum value timing where the air pressure in intake pipe becomes maximum and the minimum value timing where the air pressure in intake pipe becomes minimum in the period where the intake valve corresponding to each cylinder opens and its nearby period.

In another embodiment of the present invention, the device is provided with a flow rate sensor for detecting a throttle valve air passage flow rate through the throttle valve, and the throttle valve air passage calculating means calculates the amount Mt of throttle air passage based on the following equation (1):

$$Mt=mt\cdot(\Delta tdwn+\Delta tioc)/2 \quad (1)$$

where

Δtdwn: period between the maximum value timing where the air pressure in intake pipe becomes maximum and the minimum value timing where the air pressure in intake pipe becomes minimum in the period where the intake valve corresponding to each cylinder opens and its nearby period;

Δtioc: period between opening timing and closing timing of intake valve;

mt: throttle valve air passage flow rate detected by flow rate sensor during these periods.

In another embodiment of the present invention, the engine control means controls a fuel injection amount and ignition timing based on the cylinder air charge amount for each cylinder estimated by the cylinder air charge estimating means.

In another embodiment of the present invention, the intake valve is changed in operating angle in accordance with the engine operating state, and the device stores in advance the relationship between the cylinder air charge amount and the operating angle of the intake valves in the state of a specific engine operating state, estimates an actual operating angle in each cylinder based on the cylinder air charge amount calculated by the cylinder air charge calculating means and the stored relationship, and, when the estimated actual operating angle and target operating angle differ, corrects operating parameters of the internal combustion engine so as to compensate for the difference in operating angle.

In another embodiment of the present invention, the device is further provided with an air predicting means for predicting an average cylinder air charge amount for all cylinders based on at least the throttle opening degree and the atmospheric temperature and atmospheric pressure around the internal combustion engine, the device calculates a relative error between cylinders based on the cylinder air charge amount for each cylinder estimated by the cylinder air charge estimating means when the engine operating state is a steady state, and the engine control means controls the internal combustion engine based on the cylinder air charge amount for each cylinder calculated by correcting the average cylinder air charge amount predicted by the air predicting means when the engine operating state is a transient state based on the error.

According to the present invention, the amount of throttle air passage is calculated by a throttle air passage calculating means, the excess amount of air is calculated by the excess air calculating means, the cylinder air charge amount is estimated for each cylinder based on these, and the internal combustion engine is controlled based on this. The cylinder air charge amount can be calculated from just the amount of air corresponding to the drop in air pressure in intake pipe occurring due to pulsation of the air pressure in intake pipe and the amount of throttle air passage. Therefore, according to the present invention, it is possible to easily estimate the cylinder air charge amount for each cylinder utilizing pulsation of the air pressure in intake pipe and optimally control the internal combustion engine.

BRIEF DESCRIPTION OF THE DRAWINGS

These and other objects and features of the present invention will become clearer from the following description of the preferred embodiments given with reference to the attached drawings, wherein:

FIG. 19 is a view of the basic concept of a throttle model;

FIG. 20 is a view of the basic concept of an intake pipe model;

DESCRIPTION OF THE PREFERRED EMBODIMENTS

Figure 1:
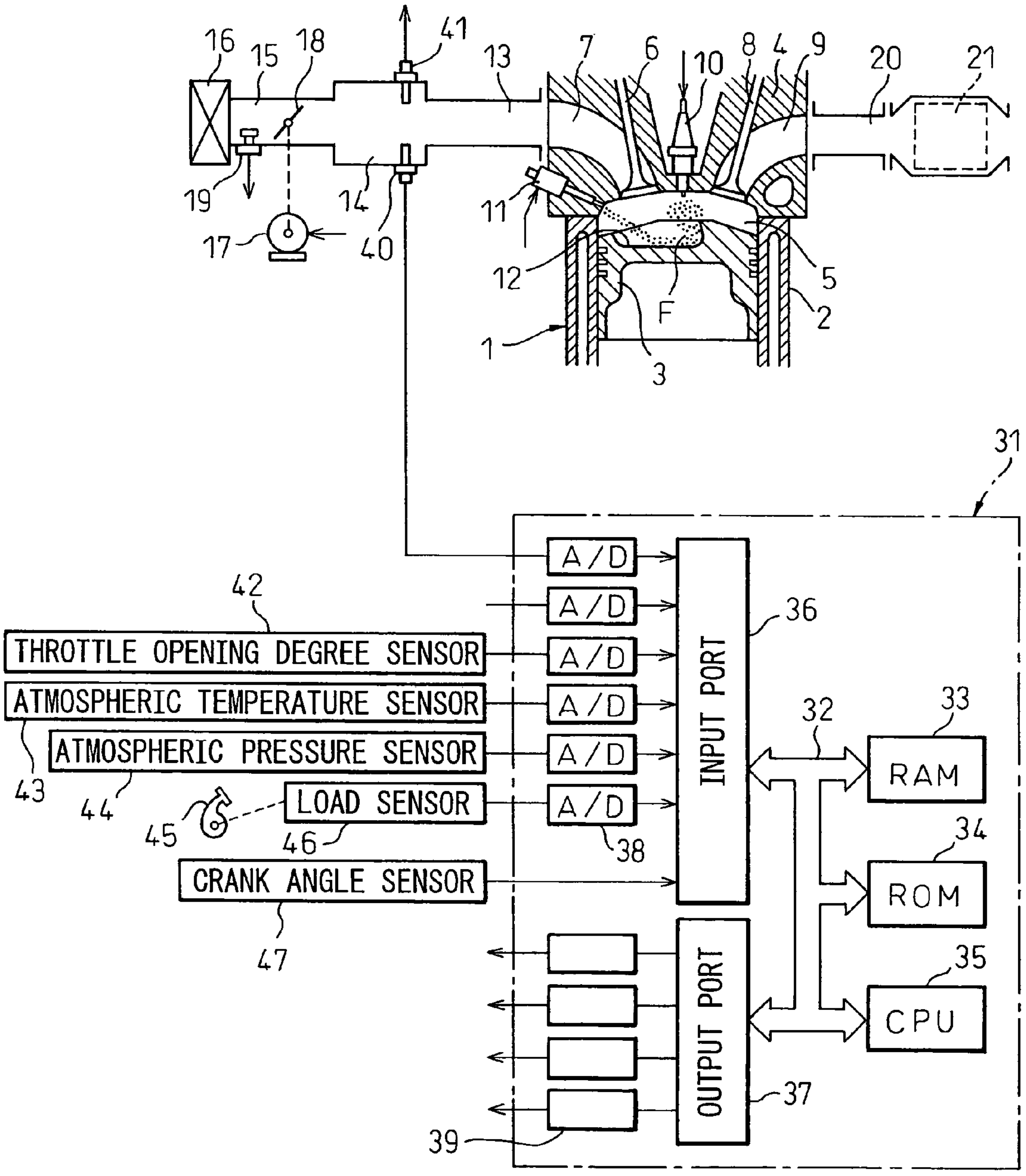
FIG. 1 is a view of an overall internal combustion engine in which the control device for an internal combustion engine of the present invention is used.

Preferred embodiments of the present invention will be described in detail below while referring to the attached figures. The engine body 1 schematically shown in FIG. 1 is a cylinder injection type spark ignition internal combustion engine. Note that the present invention may also be applied to another spark ignition internal combustion engine or a compression ignition internal combustion engine.

As shown in FIG. 1, in a first embodiment of the present invention, the engine body 1 is provided with a cylinder block 2, pistons 3 moving reciprocally inside the cylinder block 2, and a cylinder head 4 fixed on the cylinder block 2. Each piston 3 and the cylinder head 4 have a combustion chamber 5 formed between them. The cylinder head 4 has an intake valve 6, intake port 7, exhaust valve 8, and exhaust port 9 arranged for each cylinder. Further, as shown in FIG. 1, for each cylinder, a spark plug 10 is arranged at the center of the inside wall of the cylinder head 4, while a fuel injector 11 is arranged at the periphery of the inside wall of the cylinder head 4. Further, the top surface of each piston 3 is formed with a cavity 12 extending from below the fuel injector 11 to below the spark plug 10.

The intake port 7 of each cylinder is connected with a surge tank 14 through an intake pipe 13. The surge tank 14 is connected with an air cleaner 16 through an intake pipe 15. The intake pipe 15 has a throttle valve 18 driven by a step motor 17 arranged in it. Further, the intake pipe 15 upstream of the throttle valve 18 is provided with an air flow meter 19 for detecting the flow rate of the air (intake gas) flowing in the intake pipe 15. On the other hand, the exhaust port 9 of each cylinder is connected with an exhaust pipe 20. This exhaust pipe 20 is connected to an exhaust purification device 21.

An electronic control unit (ECU) 31 is comprised of a digital computer comprised of a random access memory (RAM) 33, a read only memory (ROM) 34, a microprocessor (CPU) 35, an input port 36, and an output port 37 connected with each other through a two-way bus 32. The surge tank 14 is provided with an intake pipe pressure sensor 40 for detecting a pressure of the air (intake gas) inside the intake pipe and an intake pipe temperature sensor 41 for detecting a temperature of the air inside the intake pipe. The intake pipe pressure sensor 40 and intake pipe temperature sensor 41 generate output voltages proportional to the air pressure in intake pipe and air temperature in intake pipe. The output voltages are input to the input port 36 through corresponding A/D converters 38.

Further, a throttle opening degree sensor 42 for detecting an opening degree of the throttle valve 18, an atmospheric temperature sensor 43 for detecting the temperature of the atmosphere around the internal combustion engine or the temperature of the air taken into the intake pipe 15 (intake temperature), and an atmospheric pressure sensor 44 for detecting the pressure of the atmosphere around the internal combustion engine or the pressure of the air taken into the intake pipe 15 (intake pressure) are provided. The output voltages of these sensors are input through the corresponding AD converters 38 to the input port 36. Further, the accelerator pedal 45 has a load sensor 46 for generating an output voltage proportional to the amount of depression of the accelerator pedal 45 connected to it. The output voltage of the load sensor 46 is input through the corresponding AD converter 38 to the input port 36. A crank angle sensor 47 generates an output pulse each time for example the crankshaft rotates 30 degrees. This output pulse is input to the input port 36. The CPU 35 calculates the engine speed from the output pulses of the crank angle sensor 47. On the other hand, the output port 37 is connected through the corresponding drive circuits 39 to the spark plugs 10, fuel injectors 11, and step motor 17.

By the way, in order for a control device of an internal combustion engine to make the air-fuel ratio of the air-fuel mixture burned in a combustion chamber 5 of the internal combustion engine the target air-fuel ratio, it estimates the amount of the air (intake gas) charged in the combustion chamber 5 when the intake valve is closed (hereinafter referred to as the "cylinder air charge amount Mc") and determines the amount of fuel to be injected from the fuel injector to the combustion chamber 5 of the internal combustion engine (or intake passage) (hereinafter referred to as the "fuel injection amount") so that the air-fuel ratio of the air-fuel mixture becomes the target air-fuel ratio based on the estimated cylinder air charge amount Mc. Therefore, to make the air-fuel ratio of the air-fuel mixture burned in a combustion chamber 5 of the internal combustion engine accurately the target air-fuel ratio, it is necessary to accurately estimate the cylinder air charge amount Mc.

Normally, the cylinder air charge amount Mc is estimated from a large number of sensors such as a flow rate sensor (air flow meter) and a large number of maps having output values from these sensors as arguments. When using maps to estimate the cylinder air charge amount Mc in this way, however, to make the estimated value of the cylinder air charge amount Mc more accurate, the number of the maps required and the number of their arguments increase. If the number of maps increase in this way, the ROM of the ECU for storing the maps has to be made one with a large storage capacity and the cost of production of the control device of the internal combustion engine ends up becoming higher. Further, to create the maps, compliance work must be performed for each type of internal combustion engine at which the maps are used. The measurement points in the compliance work increase along with the number of maps and the number of their arguments. If the number of maps and number of their arguments increase, the number of steps in the compliance work also end up increasing.

Therefore, control devices of internal combustion engines using various models rather than maps in order to calculate the cylinder air charge amount Mc by numerical calculation are being studied. In such control devices, numerical calculations are made great use of so as to reduce the number of required maps as much as possible. Due to this, the number of steps at the time of the compliance work is greatly slashed while being able to accurately calculate the cylinder air charge amount Mc.

As one such model, there is the one which calculates the cylinder air charge amount Mc from the flow rate of air passing through the throttle valve 18 per unit time (hereinafter referred to as the "throttle valve air passage flow rate mt") and the pressure of the air present in the part of the intake pipe 15 etc. from the throttle valve 18 to the intake valve 6 (hereinafter referred to as the "intake pipe part") (hereinafter referred to as the "air pressure in intake pipe Pm") (for example, see Japanese Unexamined Patent Publication (Kokai) No. 2002-70633). In such a model, use is made of the law of the conservation of mass that dictates that the flow rate of the air sucked into a cylinder (that is, the flow rate of the intake gas flowing out from the intake pipe part; hereinafter referred to as the "cylinder air intake flow rate mc") is equal to the throttle valve air passage flow rate mt (that is, the flow rate of the air flowing into the intake pipe part) minus the amount of intake gas corresponding to the amount of rise of the air pressure in intake pipe Pm per unit time (that is, the amount of intake gas accumulated in the intake pipe part).

Normally, in the intake pipe part, intake pulsation occurs due to the intake valves successively being opened, so the air pressure in intake pipe fluctuates greatly. If using this greatly fluctuating air pressure in intake pipe to prepare a model using the above law of conservation of mass, the model equations would become complicated and the calculation load would end up becoming great. Therefore, in the past, to eliminate the effect of fluctuation of the air pressure in intake pipe due to the intake pulsation, the error between the detected value of the intake pipe pressure sensor and the deemed value of the detected value has been used for example as the amount of change (dPm/dt) of the air pressure in intake pipe per unit time.

However, the fluctuation in the air pressure in intake pipe due to intake pulsation has a great effect on the cylinder air charge amount. Therefore, if calculating the cylinder air charge amount ignoring this effect, it is not possible to calculate the accurate cylinder air charge amount. Conversely, if utilizing the fact that the fluctuation in the air pressure in intake pipe due to the intake pulsation is closely related to the cylinder air charge amount, it is possible to accurately calculate the cylinder air charge amount to each cylinder. Therefore, the present invention utilizes this to calculate the cylinder air charge amount.

Figure 2:
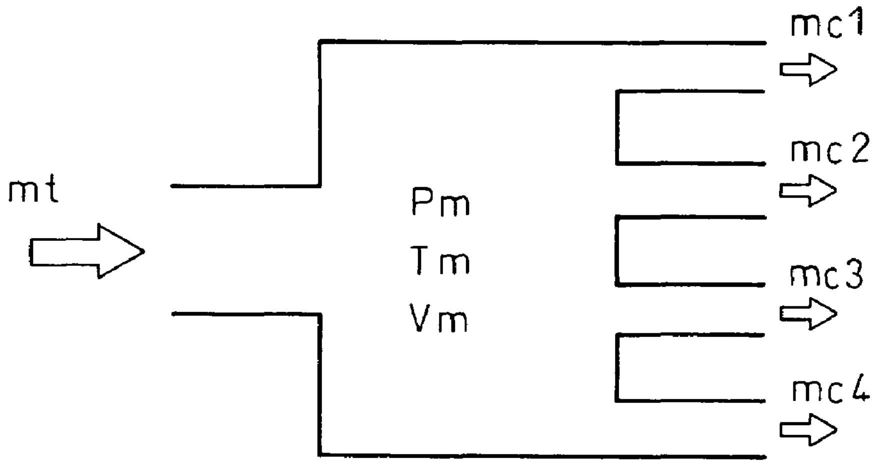
FIG. 2 is a view of the basic concept of an intake pipe model of the present invention.
Figure 3A:
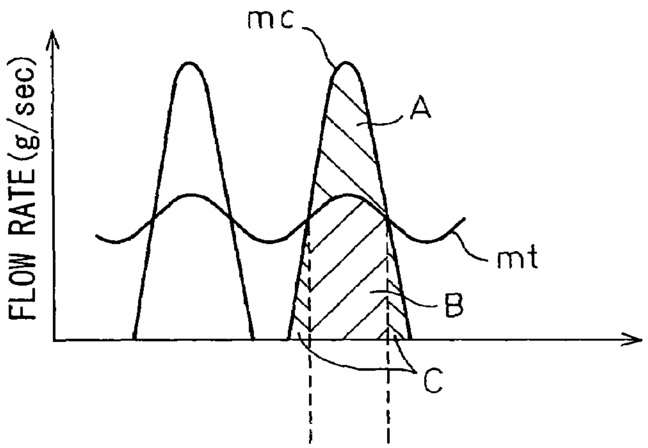
FIGS. 3A and 3B are views of a change in a flow rate and a change in an air pressure in intake pipe, with respect to a crank angle.
Figure 3B:
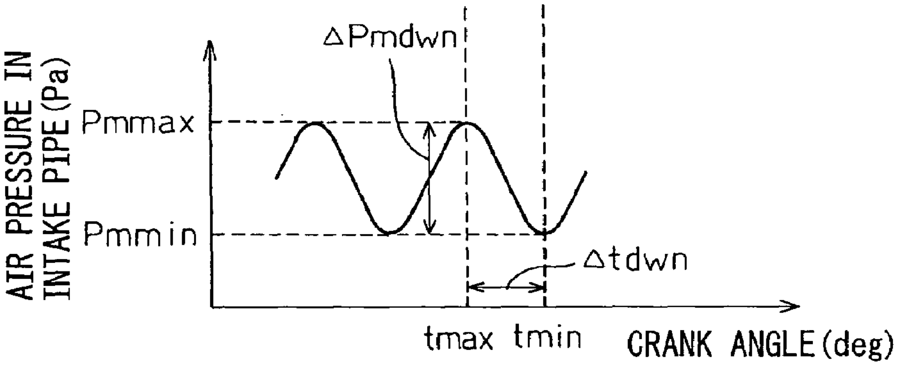

Below, the method of calculation of the cylinder air charge amount will be explained with reference to FIG. 2 and FIG. 3. Note that FIG. 2 shows the basic concept of the model M1 at the intake pipe part (hereinafter referred to as the "intake pipe model"). FIG. 3A shows the change in the flow rate with respect to the crank angle. The solid line mt in FIG. 3 shows the throttle valve air passage flow rate, while the solid line mc shows the cylinder air intake flow rate to all cylinders. Further, FIG. 3B shows the change in the air pressure in intake pipe with respect to the crank angle.

First, consider the intake pipe model M1 shown in FIG. 2. If applying the law of the conservation of mass to the intake pipe part, the relationship of the following equation (2) stands among the air pressure in intake pipe Pm, the flow rate of air flowing to the intake pipe part (that is, the throttle valve air passage flow rate mt), and the flow rate of the intake gas flowing out from the intake pipe part (that is, the cylinder air intake flow rate mci to the i-th cylinder).

$$\frac{dPm}{dt} = \frac{Ra \cdot Tm}{Vm} \cdot (mt - \Sigma mci) \tag{2}$$

Here, Tm is the temperature of the air present in the intake pipe part (hereinafter referred to as the "air temperature in intake pipe"), Vm is the volume of the intake pipe part, and Ra is the gas constant divided by the average molecular weight of the air. Therefore, the amount of change ΔPm of the air pressure in intake pipe in the Δt seconds from the time t can be expressed by the following equation (3) by integrating equation (2):

$$\Delta Pm = \frac{Ra \cdot Tm}{Vm} \cdot \int_{t}^{t+\Delta t} (mt - \Sigma mci) \tag{3}$$

From equation (3), if the flow rate of inflowing air (mt) into the intake pipe part is larger than the flow rate of outflowing air (mci), the air pressure in intake pipe will rise, if smaller, the air pressure in intake pipe will drop, and if equal, the air pressure in intake pipe will be constant. It is learned that the amount of change ΔPm of the air pressure in intake pipe in the Δt seconds corresponds to the amount of change of the amount of air in the intake pipe part. Note that when the engine operating state is a steady state as explained later, the flow rate of outflowing air (mci) from the intake pipe part will become intermittent depending on the operation of the intake valves 6, while the flow rate of inflowing air (mt) will become gentler in change because the intake pipe part acts as a buffer. Therefore, the relative magnitude of the flow rate of outflowing air (mci) and the flow rate of inflowing air (mt) repeatedly reverses (see FIG. 3A). This means that figures in parentheses at the right side of equation (2) will repeatedly invert in sign at a constant period, that is, the air pressure in intake pipe will repeatedly rise and fall with a constant period. This shows pulsation of the air pressure in intake pipe.

Here assume as shown in FIG. 3A that the opening periods of the intake valves 6 of the cylinders do not overlap. In this case, regarding the intake to the i-th cylinder, the air pressure in intake pipe becomes the maximum value Pmmax when the time differential of the air pressure in intake pipe is zero (dPm/dt=0), that is, the throttle valve air passage flow rate mt and the cylinder air intake flow rate mci to the i-th cylinder are balanced in magnitude (mt=mci) and the cylinder intake air amount mci increases, that is, the throttle valve air passage flow rate mt is larger until the magnitudes balance (the timing at this time being designated as the maximum value timing tmax). On the other hand, regarding the intake to the i-th cylinder, the air pressure in intake pipe takes the minimum value Pmmin when the time differential of the air pressure in intake pipe is zero and the cylinder intake gas amount mci decreases, that is, the cylinder intake gas amount mci is larger until the magnitudes balanced (the timing at this time being designated as the minimum value timing tmin).

Therefore, the drop ΔPmdwn in the air pressure in intake pipe arising due to the intake of intake gas to the i-th cylinder (that is, the difference between the maximum value Pmmax and minimum value Pmmin of the air pressure in intake pipe; hereinafter referred to as the "intake pipe pressure drop") can be expressed as shown in the following equation (4). Note that it is learned that the integration term of equation (4) corresponds to the area A of FIG. 3A and ΔPmdwn is proportional to the area A. Therefore, the amount of gas corresponding to the area A can be called the "amount of excess gas" to the i-th cylinder corresponding to the drop in the air pressure in intake pipe due to the intake valve corresponding to the i-th cylinder opening.

$$\Delta Pmdwn = \left| \frac{Ra \cdot Tm}{Vm} \cdot \int_{t\,max}^{t\,min} (mt - \Sigma mci)dt \right| \tag{4}$$

Due to the assumption that the opening periods of the intake valves 6 of the cylinders do not overlap, the above equation (4) can be modified as shown in the following equation (5).

$$Mci = \int_{t\,max}^{t\,min} mci\, dt = \frac{\Delta Pmdwn}{\left(\frac{Ra \cdot Tm}{Vm}\right) + \int_{t\,max}^{t\,min} mt\, dt} \tag{5}$$

Here, the integration term of the throttle valve air passage flow rate mt in equation (5) corresponds to the area B of FIG. 3A, while Mci is the value of the area A and area B of FIG. 3 added together. Therefore, Mci corresponds to the amount of gas charged in the combustion chamber 5 of the i-th cylinder during the opening period of the intake valve 6 corresponding to the i-th cylinder, that is, the cylinder air charge amount. However, strictly speaking, the actual cylinder air charge amount corresponds to the amount of the area A and area B plus the area C of FIG. 3, so the Mci becomes an approximate value ignoring the amount of gas corresponding to the area C as being slight.

Therefore, when the engine operating state is the steady state and the opening periods of the intake valves 6 of the cylinders do not overlap, by detecting or calculating the throttle valve air passage flow rate mt, the air temperature in intake pipe Tm, and the intake pipe pressure drop ΔPmdwn, it is possible to estimate the cylinder air charge amount Mci to the i-th cylinder from equation (5).

Note that in loading equation (5), equation (5) may also be modified as in equation (6):

$$Mci = \frac{\Delta Pmdwn}{\left(\frac{Ra \cdot Tm}{Vm}\right) + mt \cdot \Delta tdwn} \quad (6)$$

In equation (6), Δtdwn is the time period between the maximum value timing tmax and the minimum value timing tmin and expresses the time period of drop of the air pressure in intake pipe. Further, the throttle valve air passage flow rate mt in equation (6) is the average value of the detected values of the air flow meter 19 during the time period from the maximum value timing tmax to the minimum value timing tmin or during the opening period of the intake valve 6. Alternatively, since the actual fluctuation of the throttle valve air passage flow rate during the time period from the maximum value timing tmax to the minimum value timing tmin or during the opening period of the intake valves 6 is small, it is also possible to use the detected value of the air flow meter 19 at a specific time during that time period. Similarly, the air temperature in intake pipe Tm in equation (6) is also the average of the detected values of the intake pipe temperature sensor 41 during the above time period or the detected value of the intake pipe temperature sensor 41 at a specific time during that time period.

Further, in the above embodiment, the surge tank 14 is provided with the intake pipe temperature sensor 41 which detects the temperature of the intake gas in the intake pipe part, but it is also possible to attach a temperature sensor at the intake upstream side of the throttle valve 18 or provide a temperature sensor integral with the air flow meter 19 and use the temperature detected by that temperature sensor as the air temperature in intake pipe. This is because when the engine operating state is the steady state, it is possible to approximate the air temperature in intake pipe as being substantially equal to the temperature of the air at the intake upstream side of the throttle valve 18 and, in the present embodiment, the cylinder air charge amount Mci to the i-th cylinder is estimated when the engine operating state is the steady state.

Figure 4:
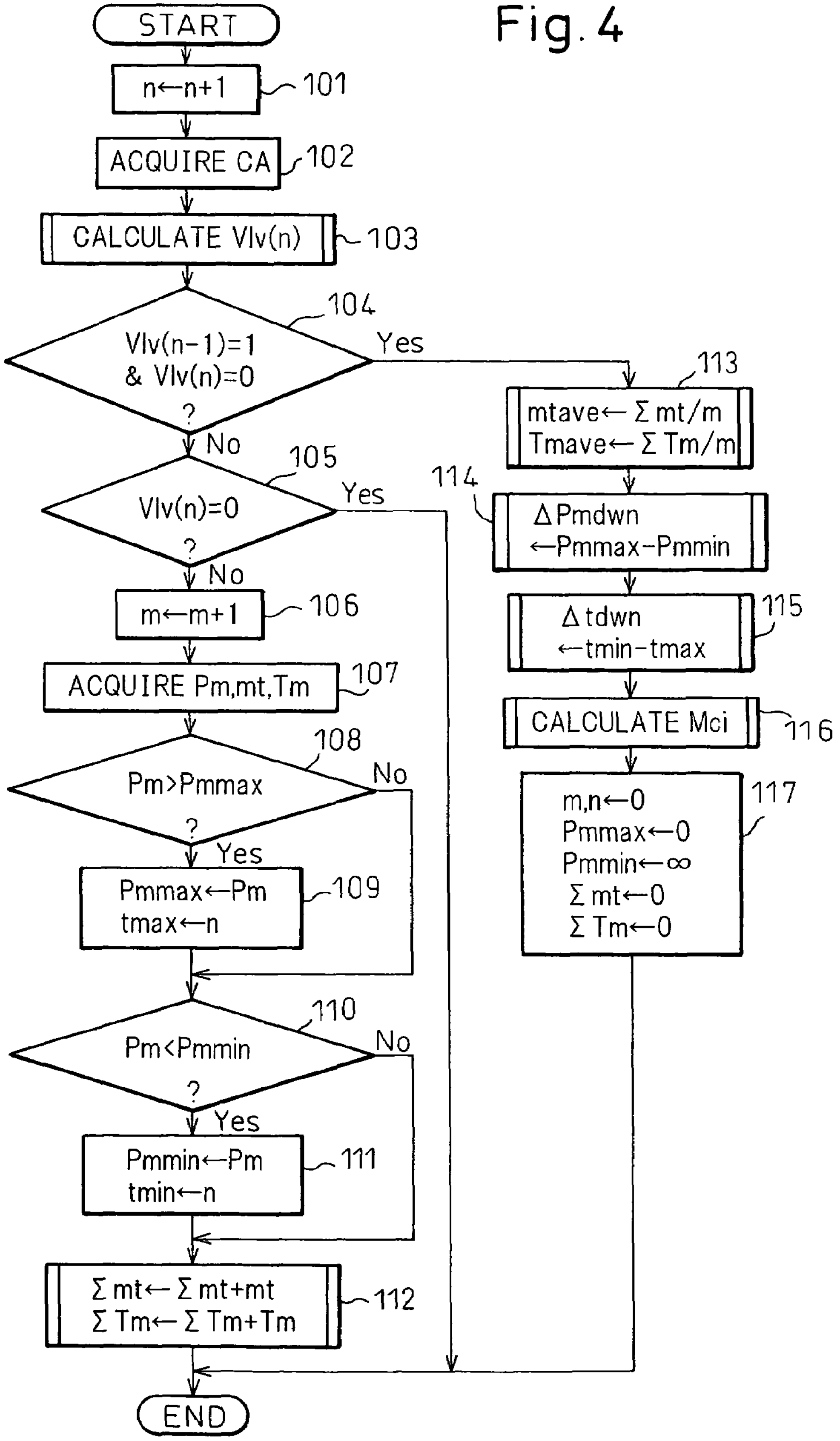
FIG. 4 is a flow chart of a routine of a procedure for estimating a cylinder air charge amount for each cylinder.

Referring to FIG. 4, the routine of the procedure fo@r estimating the cylinder air charge amount to the i-th cylinder using equation (5) of the intake pipe model M1 will be explained. Note that this procedure is preferably executed for every predetermined time interval and every cylinder and further particularly executed when the engine operating state is the steady state and the opening periods of the intake valves 6 of the cylinders do not overlap.

First, at step 101, the count of the time counter n is incremented by "1". The time counter n shows the number of times of execution of the procedure from when the intake valve of the i-th cylinder closed the previous time and therefore shows the elapsed time from the closing of the intake valve. Below, the count of the time counter will be explained as the time. Next, at step 102, the current crank angle CA is obtained from the crank angle sensor 47. At step 103, the value to be set at the valve flag Vlv(n) is calculated from the crank angle CA obtained at step 102. Note that the valve flag Vlv(n) shows the valve operating state of the intake valve 6 of the i-th cylinder at the time n. When the intake valve 6 of the i-th cylinder is open at the time n, the value of the valve flag Vlv(n) is set to "1", while when it is closed, it is set to "0".

Next, at step 104, it is judged if the value of the valve flag Vlv(n−1) at the time n−1 has been set to "1" and the value of the valve flag Vlv(n) at the time n has been set to "0". That is, at step 104, it is judged if the intake valve 6 was opened at the time of the previous procedure and the intake valve 6 is closed at the time of the current procedure, that is, if the current procedure is performed at the time when the intake valve 6 is closed. When it is judged at step 104 that the current procedure is not performed at the time when the intake valve 6 is closed, the routine proceeds to step 105.

At step 105, it is judged if the value of the valve flag Vlv(n) at the time n is 0 or not, that is, if the intake valve 6 of the i-th cylinder is closed. When the intake valve 6 of the i-th cylinder is closed (Vlv(n)=0), step 106 to step 112 are not executed and the procedure is ended.

On the other hand, when it is judged at step 105 that the intake valve 6 of the i-th cylinder is opened, the routine proceeds to step 106. At step 106, the count of the valve opening counter m is incremented by "1". Note that the valve opening counter m shows the number of times of execution of this procedure from opening of the intake valve 6 and therefore shows the elapsed time from the opening of the intake valve 6. At step 107, the air pressure in intake pipe Pm, throttle valve air passage flow rate mt, and air temperature in intake pipe Tm are acquired from the intake pipe pressure sensor 40, air flow meter 19, and intake pipe temperature sensor 41, respectively.

At steps 108 to 111, the maximum value Pmmax and minimum value Pmmin of the air pressure in intake pipe during the opening period of the intake valve 6 and the maximum value timing tmax and minimum value timing tmin are updated.

At step 108, it is judged if the air pressure in intake pipe Pm obtained at step 107 is larger than the maximum value Pmmax of the air pressure in intake pipe currently stored, that is, if the obtained air pressure in intake pipe Pm is the maximum from when the intake valve 6 was opened. Only when it is judged that the obtained air pressure in intake pipe Pm is the maximum (Pm>Pmmax) is step 109 executed. At step 109, the air pressure in intake pipe Pm obtained at step 107 is stored as the maximum value Pmmax of the air pressure in intake pipe and the current time n is stored as the maximum value timing tmax.

Next, at step 110, it is judged if the air pressure in intake pipe Pm obtained at step 107 is smaller than the minimum value Pmmin of the air pressure in intake pipe currently stored, that is, if the obtained air pressure in intake pipe Pm is the minimum from when the intake valve 6 was opened. Only when it is judged that the obtained air pressure in intake pipe Pm is the minimum (Pm<Pmmin) is step 111 executed. At step 111, the air pressure in intake pipe Pm obtained at step 107 is stored as the minimum value Pmmin of the air pressure in intake pipe and the current time n is stored as the minimum value timing tmin.

At step 112, the cumulative value Σmt of the throttle valve air passage flow rate from when the intake valve 6 of the i-th cylinder opened is increased by the current throttle valve air passage flow rate obtained at step 107. Further, the cumulative value ΣTm of the air temperature in intake pipe from when the intake valve 6 of the i-th cylinder opened is increase by the current air temperature in intake pipe Tm obtained at step 107.

On the other hand, when it is judged at step 104 that the current procedure is performed when the intake valve 6 is closed, the routine proceeds to step 113. At step 113, the cumulative value Σmt of the throttle valve air passage flow rate during the opening period of the intake valve 6 divided by the count m of the opening counter is made the average throttle valve air passage flow rate mtave. This average throttle valve air passage flow rate mtave shows the average value of the throttle valve air passage flow rate during the opening period of the intake valve 6. Further, the cumulative value ΣTm of the air temperature in intake pipe during the open period of the intake valve 6 divided by the count m of the opening counter is made the average air temperature in intake pipe Tmave. This average air temperature in intake pipe Tmave shows the average value of the air temperature in intake pipe during the opening period of the intake valve 6.

Next, at step 114, the maximum value Pmmax of the air pressure in intake pipe updated at step 109 minus the minimum value Pmmin of the air pressure in intake pipe updated at step 111 is made the intake pipe pressure drop ΔPmdwn (ΔPmdwn=Pmmax−Pmmin). At step 115, the minimum value timing tmin updated at step 111 minus the maximum value timing tmax updated at step 109 is made Δtdwn (Δtdwn=tmin−tmax).

At step 116, the mtave, Tmave, ΔPmdwn, and Δtdwn calculated at steps 113 to 115 are entered into equation (6) to calculate the cylinder air charge amount Mci to the combustion chamber 5 of the i-th cylinder. Next, at step 117, the counts of the counters n and m are reset to zero, the value of Pmmax is made zero, the value of Pmmin is made infinity, and the values of the cumulative values Σmt and ΣTm are reset to zero.

By the way, with the control device of the internal combustion engine of this embodiment, the fuel injection amount from the fuel injector 11 injected into the i-th cylinder is determined so that the air-fuel ratio of the air-fuel mixture in the i-th cylinder becomes the target air-fuel ratio based on the cylinder air charge amount Mci to the i-th cylinder estimated in the above way. The target air-fuel ratio is determined by the ECU 31 based on the engine operating state (for example, the engine speed and engine load) etc. Due to this, even if variation occurs in the cylinder air charge amount among cylinders, it is possible to make the air-fuel ratio of the air-fuel mixture substantially accurately the target air-fuel ratio for all cylinders and possible to suppress deterioration of the emission properties.

However, when determining the fuel injection amount in this way, if variation occurs in the cylinder air charge amount among cylinders, the fuel injection amount injected from the fuel injector 11 will end up differing among the cylinders. Therefore, the combustion energy occurring due to burning of the fuel and contributing to the depression of the piston 3 (hereinafter simply referred to as the "combustion energy") will also differ among cylinders and consequently torque fluctuation will end up occurring. Therefore, to suppress occurrence of torque fluctuation, in addition to determining the fuel injection amount so that the air-fuel ratio of the air-fuel mixture in each cylinder becomes the target air-fuel ratio in the above way, it is necessary that the combustion energy become equal among cylinders.

Figure 5:
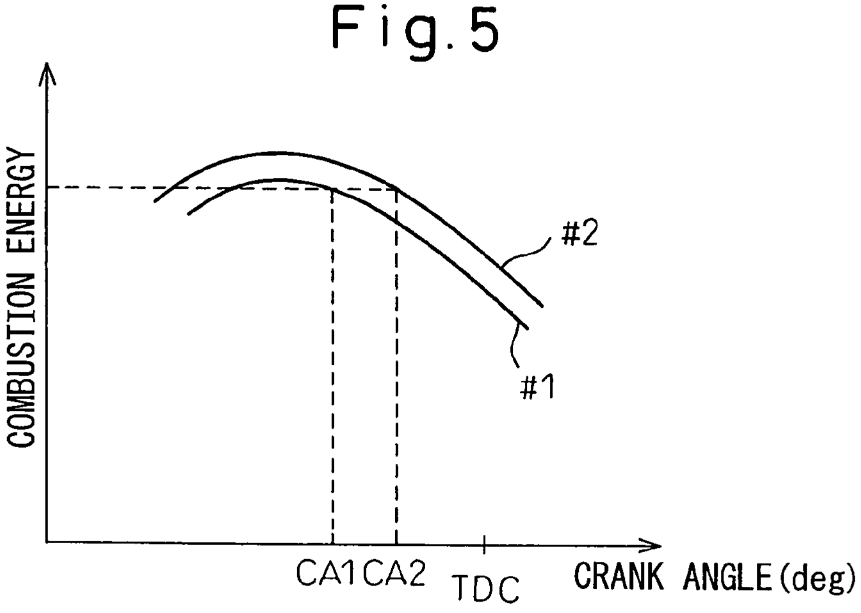
FIG. 5 is a view of the relationship between ignition timing and combustion energy for each cylinder.

Therefore, in the present embodiment, by adjusting the ignition timing of the spark plug 10 for each cylinder, the combustion energy is made uniform for all cylinders. This state will be explained referring to FIG. 5 taking as an example the first cylinder and second cylinder. FIG. 5 shows the relationship between the ignition timing in each cylinder and the combustion energy. In the figure, TDC shows compression top dead center in each cylinder.

Consider the case where there is variation in the cylinder air charge amount between the first cylinder and the second cylinder, the cylinder air charge amount to the first cylinder is smaller than the cylinder air charge amount to the second cylinder, the relationship between the ignition timing at the first cylinder and the combustion energy becomes as shown by the solid line #1 as shown in FIG. 5, and the relationship between the ignition timing at the second cylinder and the combustion energy becomes as shown by the solid line #2.

In this case, for the first cylinder, the ignition operation by the spark plug 10 is performed at an ignition timing at the most advanced side in the range where knocking etc. will not occur (CA1 in the figure, hereinafter referred to as the "first ignition timing"). At this time, for the second cylinder, if ignition is performed at the same ignition timing as the first ignition timing CA1, the combustion energy produced will end up becoming larger than that of the first cylinder. Therefore, in the second cylinder, the ignition is performed at an ignition timing whereby a combustion energy substantially the same as the combustion energy occurring when ignition was performed at the first ignition timing at the first cylinder is produced and at the retarded side from the first ignition timing CA1 (in the figure, CA2, hereinafter referred to as the "second ignition timing"). By doing this, it is possible to keep the air-fuel ratio of the air-fuel mixture substantially uniform for all cylinders and keep the combustion energy produced in the cylinders substantially uniform for all cylinders and thereby suppress deterioration of the emission properties and suppress torque fluctuation.

Note that in the above explanation, the explanation was given taking as an example only the first cylinder and second cylinder, but the procedure is performed for all of the cylinders (in the case of four cylinders like in the present embodiment, for all of the four cylinders). Therefore, the ignition timing of the cylinder with the smallest cylinder air charge amount among all of the cylinders is made the target ignition timing, and the ignition timings of the other cylinders are determined so that the combustion energy occurring in those cylinders becomes equal to the combustion energy occurring in the above cylinder.

Figure 6:
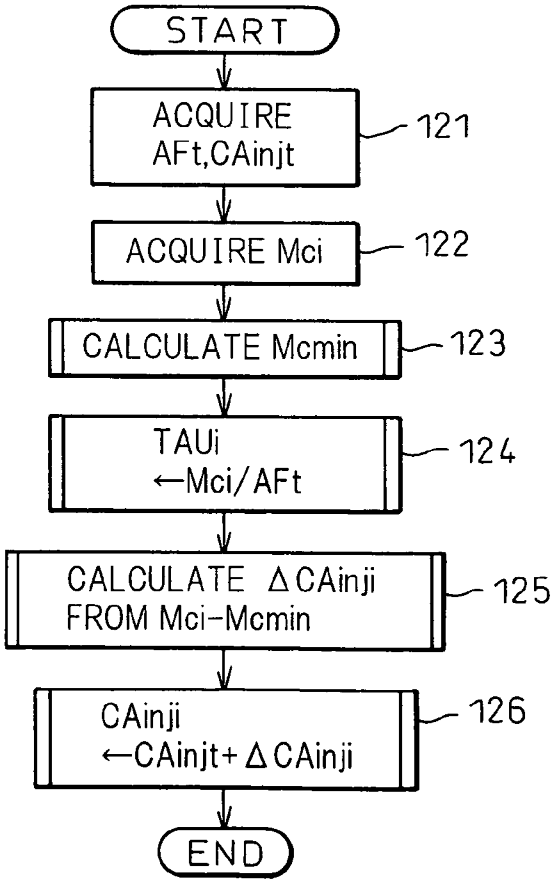
FIG. 6 is a flow chart of a routine of a procedure for determining a fuel injection amount and ignition timing for each cylinder.

The routine of the procedure for determining the fuel injection amount and ignition timing at each cylinder will be explained next referring to FIG. 6. Note that this procedure is executed for each cylinder and for each cycle. First, at step 121, the target air-fuel ratio AFt and the target ignition timing CAinjt calculated by the ECU 31 are obtained based on the engine speed and engine load and other facets of the engine operating state. Next, at step 122, the cylinder air charge amount Mci to the i-th cylinder calculated by the procedure shown in FIG. 4 is obtained.

At step 123, the cylinder air charge amount Mci to the i-th cylinder at the previous cycle is obtained, then the smallest cylinder air charge amount (hereinafter referred to as the "minimum cylinder air charge amount") Mcmin is calculated for all cylinders. For example, when the cylinder air charge amount Mc1 to the first cylinder is the smallest compared with the cylinder air charge amounts to all other cylinders, the minimum cylinder air charge amount Mcmin becomes the cylinder air charge amount Mc1 to the first cylinder. Next, at step 124, the cylinder air charge amount Mci to the i-th cylinder obtained at step 122 divided by the target air-fuel ratio AFt obtained at step 121 is made the fuel injection amount TAUi at the i-th cylinder (TAUi=Mci/AFt)

and fuel of this fuel injection amount TAUi is injected from the fuel injector 11 of the i-th cylinder at the time of fuel injection.

At step 125, the delay ΔCAinji of the ignition timing at the i-th cylinder is calculated based on the difference of the cylinder air charge amount Mci to the i-th cylinder obtained at step 122 minus the minimum cylinder air charge amount Mcmin obtained at step 123. Note that the relationship between the delay ΔCainji and the difference is calculated in advance by experiments or calculations and stored as a map in the ROM 34 of the ECU 31. This map is used in the calculation of the delay ΔCAinji at step 125. When the cylinder air charge amount Mci to the i-th cylinder is the minimum cylinder air charge amount Mcmin, the difference is zero and the delay ΔCAinji of the ignition timing at the i-th cylinder is also made zero. Next, at step 126, the value of the target ignition timing CAinjt plus the delay ΔCAinji of the ignition timing at the i-th cylinder calculated at step 125 is made the ignition timing CAinji of the i-th cylinder (CAinji=CAinjt+ΔCAinji). At the thus calculated ignition timing CAinji of the i-th cylinder, the spark plug 10 of the i-th cylinder is operated.

Next, the control device of an internal combustion engine of a second embodiment of the present invention will be explained. The control device of the second embodiment is basically the same as the control device of the first embodiment, but the routine of the procedure for estimating the cylinder air charge amount to the i-th cylinder differs.

Note that the output of the intake pipe pressure sensor 40 includes noise, so sometimes error ends up occurring in the value of the intake pipe pressure drop ΔPdwn calculated based on the output of the intake pipe pressure sensor 40. Along with this, sometimes error also occurs in the value of the cylinder air charge amount Mci calculated using this ΔPdwn. If determining the fuel injection amount etc. based on the cylinder air charge amount Mci including such error, the actual air-fuel ratio of the air-fuel mixture would end up no longer matching the target air-fuel ratio.

Therefore, in this embodiment, the average of the cylinder air charge amount calculated by the procedure of FIG. 4 is taken over a plurality of cycles for each cylinder (hereinafter referred to as the "average cylinder air charge amount Mciave") so as to correct the error of the cylinder air charge amount Mci described above. Due to this; even if error occurs in the value of ΔPmdwn due to the output of the intake pipe pressure sensor 40 including noise etc., it is possible to keep the effect of the error on the estimated cylinder air charge amount small and therefore possible to make the actual air-fuel ratio of the air-fuel mixture substantially match the target air-fuel ratio.

Figure 7:
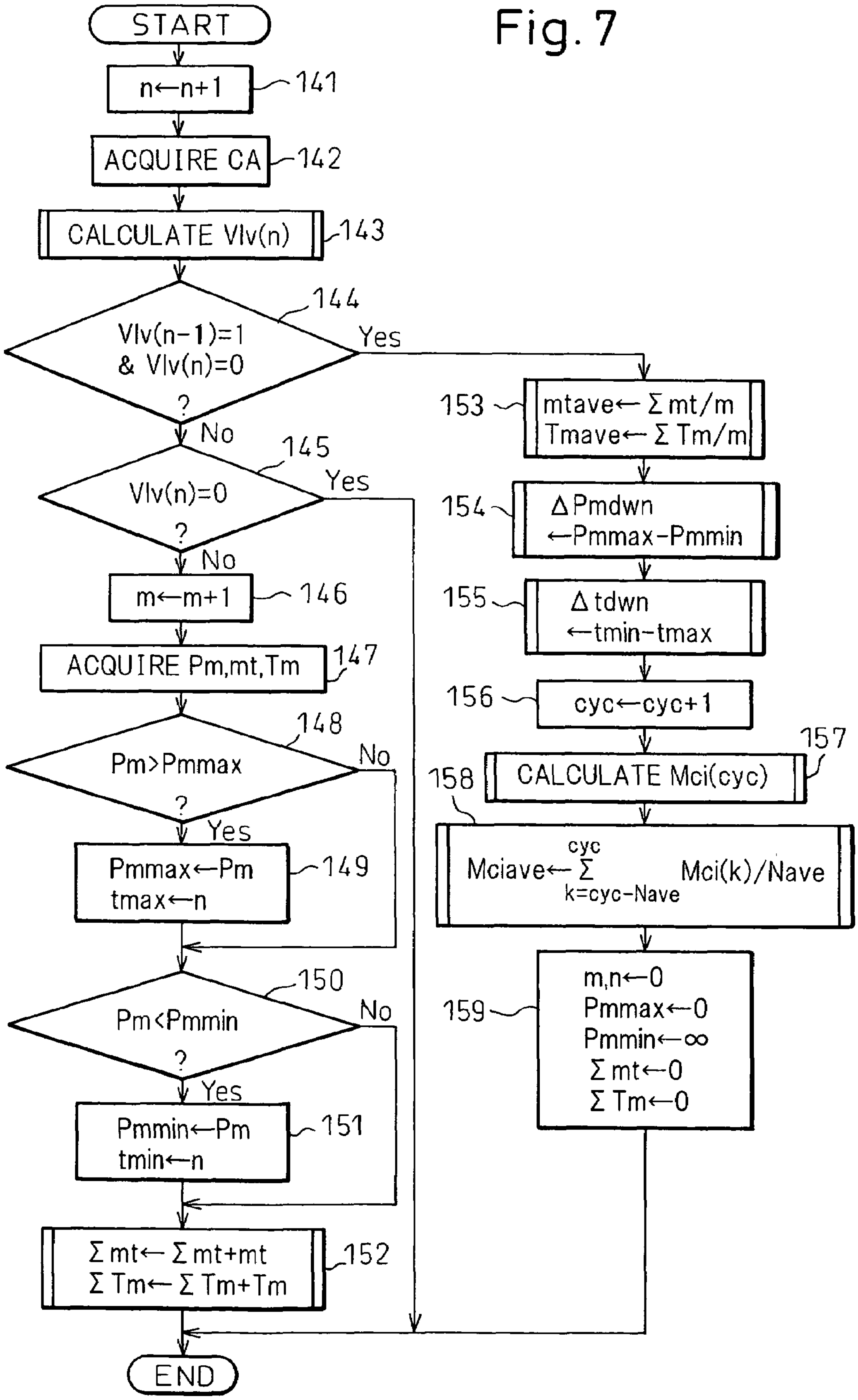
FIG. 7 is a flow chart of a routine of a procedure for estimating a cylinder air charge amount for each cylinder averaged among cycles.

Referring to FIG. 7, the routine of the procedure for estimating the cylinder air charge amount to the i-th cylinder averaged among cycles will be explained. Note that step 141 to step 155 and step 159 are similar to step 101 to step 115 and step 117 of FIG. 4, so explanations will be omitted.

At step 156, the count cyc of the cycle counter is incremented by "1". The cycle counter is a counter expressing the number of cycles from the start of engine operation. Next, at step 157, the cylinder air charge amount Mci(cyc) in this cycle cyc is calculated in the same way as step 116 of FIG. 4 by the above equation (6).

Next, at step 158, as shown in the following equation (7), the total of the cylinder air charge amounts Mci from the cycle exactly a predetermined number Nave before this cycle cyc (cyc-Nave) to this cycle cyc divided by the predetermined number Nave is calculated as the average cylinder air charge amount Mciave.

$$Mciave = \sum_{k=cyc-Nave}^{cyc} Mci(k)/Nave \tag{7}$$

Here, the predetermined number Nave is a predetermined value. In the present embodiment, the average cylinder air charge amount Mciave is used at step 122 of FIG. 6 and is utilized for calculation of the fuel injection amount and ignition timing of the i-th cylinder.

Note that in the second embodiment, instead of the procedure shown in FIG. 4, the procedure shown in FIG. 7 is performed. Otherwise, a procedure similar to the procedure in the first embodiment is performed. Further, in the above embodiments, the average cylinder air charge amount Mciave was made the average of a predetermined number Nave of cylinder air charge amounts Mci, but it is also possible to make it a weighted average or other value as well.

Next, the control device of an internal combustion engine of a third embodiment of the present invention will be explained. The control device of the third embodiment is basically the same as the control device of the first embodiment, but the intake pipe part including the surge tank 14 and intake pipe at the intake upstream side of the throttle valve 18 are not provided with any intake pipe temperature sensor 41. Below, the method of estimation of the cylinder air charge amount in the third embodiment will be explained with reference to FIG. 8. Note that FIG. 8 is a view similar to FIG. 3.

Note that, if designating the throttle valve air passage flow rate when the air pressure in intake pipe is dropping mtdwn, the above equation (6) can be expressed as the following equation (8):

$$Mci = \frac{\Delta Pmdwn}{\left(\frac{Ra \cdot Tm}{Vm}\right) + mtdwn \cdot \Delta tdwn} \tag{8}$$

Figure 8A:
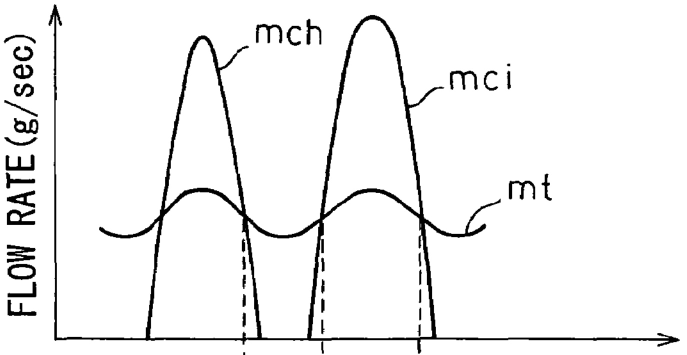
FIGS. 8A and 8B are views similar to FIG. 3 for explaining a method of estimating a cylinder air charge amount in a third embodiment.
Figure 8B:
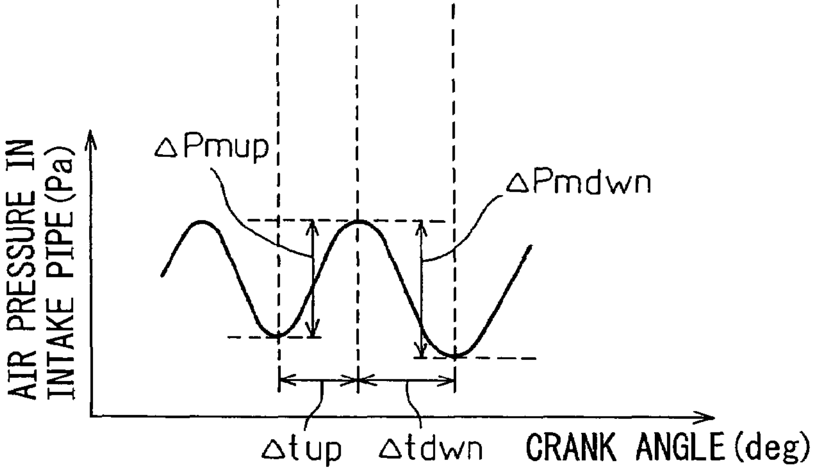

Here, the cylinder with the intake valve 6 opening before the i-th cylinder is designated as the h-th cylinder and, as shown in FIG. 8, the time period from when the air pressure in intake pipe becomes the minimum value for the intake to the h-th cylinder to when the air pressure in intake pipe becomes the maximum value for the intake to the i-th cylinder is defined as Δtup, and the rise in the air pressure in intake pipe during this time period is defined as ΔPmup.

When defining ΔPmup in this way, it is possible to approximate the cylinder air charge amounts to the h-th cylinder and the i-th cylinder during the period when the air pressure in intake pipe is rising as being substantially equal to zero. Therefore, equation (3) can be modified as shown in equation (9). If making the throttle valve air passage flow rate when the air pressure in intake pipe is rising mtup, it can be modified as shown in equation (10):

$$\Delta Pmup = \frac{Ra \cdot Tm}{Vm} \cdot \int_{t}^{t+\Delta tup} mt\, dt \tag{9}$$

$$\Delta Pmup = \frac{Ra \cdot Tm}{Vm} mtup \cdot \Delta tup \tag{10}$$

If modifying equation (10) and entering it into equation (8), it is possible to obtain the following equation (11):

$$Mci = mtup \cdot \Delta tup \frac{\Delta Pmdwn}{\Delta Pmup} + mtdwn \cdot \Delta tdwn \tag{11}$$

That is, according to equation (11), it is possible to calculate the cylinder air charge amount Mci to the i-th cylinder from the drop ΔPmdwn of the air pressure in intake pipe due to the opening of the intake valve 6 of the i-th cylinder, the drop time Δtdwn of the air pressure in intake pipe, the throttle valve air passage flow rate mtdwn when the air pressure in intake pipe is dropping, the rise ΔPmup of the air pressure in intake pipe before the opening of the intake valve 6 of the i-th cylinder, the rise time Δtup of the air pressure in intake pipe, and the throttle valve air passage flow rate mtup when the air pressure in intake pipe is rising.

Therefore, according to the third embodiment, when the opening timings of the intake valves 6 of the cylinders do not overlap, by detecting and calculating ΔPmup and Δtup by a method similar to the method of detection and calculation of ΔPmdwn and Δtdwn in the first embodiment, it is possible to calculate the cylinder air charge amount to each cylinder without using any temperature sensor and accordingly possible to achieve a reduction in the cost of production.

Note that in the above embodiment, the cylinder air charge amount Mci to the i-th cylinder is calculated based on the drop ΔPmdwn of the air pressure in intake pipe due to the opening of the intake valve 6 of the i-th cylinder and the rise ΔPmup of the air pressure in intake pipe before the opening of the intake valve 6 of the i-th cylinder, but instead of the rise ΔPmup of the air pressure in intake pipe before the intake valve 6 of the i-th cylinder opens, it is also possible to calculate the rise ΔPmup of the air pressure in intake pipe after the intake valve 6 of the i-th cylinder opens.

Next, the control device of an internal combustion engine of the fourth embodiment of the present invention will be explained. The control device of the first embodiment basically is utilized in the case when the opening timings of the intake valves 6 of the cylinders do not overlap. However, if using the control device of the first embodiment when the opening timings of the intake valves 6 of the cylinders overlap, the error of the cylinder air charge amount Mci to each cylinder calculated will end up becoming large.

Figure 9:
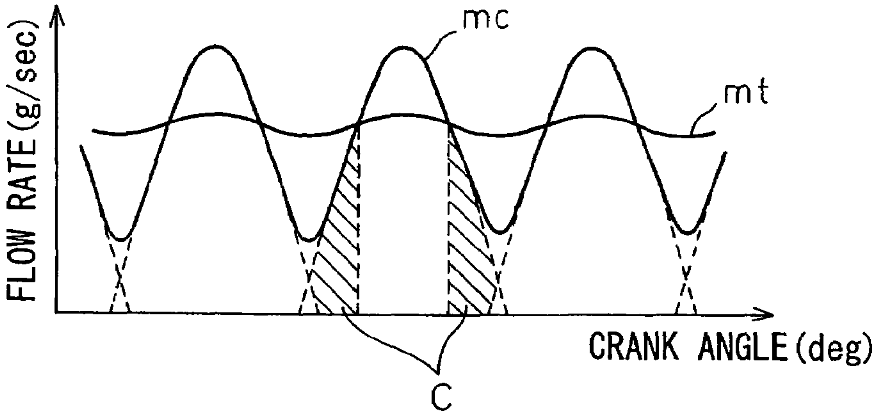
FIG. 9 is a view of a change in the flow rate with respect to the crank angle in the case where opening timings of intake valves 6 of cylinders overlap.

That is, as explained using FIG. 3A, in the first embodiment, the cylinder air charge amount is an approximate value ignoring the amount of gas corresponding to the area C as being slight. However, when the opening timings of the intake valves 6 among cylinders overlap, as shown in FIG. 9, the throttle valve air passage flow rate mt becomes large and therefore the amount of gas corresponding to the area C becomes too large to ignore.

Accordingly, in the fourth embodiment, among the cylinder air charge amounts Mci to the different cylinders, the amount of gas other than the amount of gas corresponding to the area A is found as a plateau area rather than finding it as a rectangular area as in the first embodiment. That is, instead of the mt·Δtdwn in equation (6) in the first embodiment, mt·(Δtdwn+Δtioc)/2 is used. Here, Δtdwn is the time between the maximum value timing tmax when the air pressure in intake pipe becomes the maximum value Pmmax and the minimum value timing tmin when it becomes the minimum value Pmmin as explained above (Δtdwn=tmin−tmax), while Δtioc is the time between the timing when the intake valve 6 of the i-th cylinder opens (opening timing) tio and the timing when the intake valve 6 closes (closing timing) tic, that is, the time during which the intake valve 6 of the i-th cylinder is open (Δtioc=tic−tio). Therefore, in the fourth embodiment, equation (6) is used rewritten as in the following equation (12):

$$Mci = \Delta Pmdwn \Big/ \left(\frac{Ra \cdot Tm}{Vm}\right) + mt \cdot \frac{\Delta tdwn + \Delta tioc}{2} \tag{12}$$

Figure 10A:
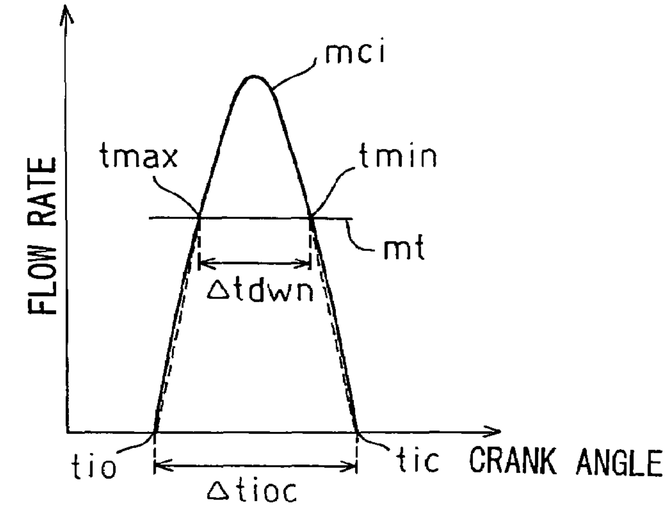
FIGS. 10A and 10B are views of a change in the flow rate with respect to the crank angle.
Figure 10B:
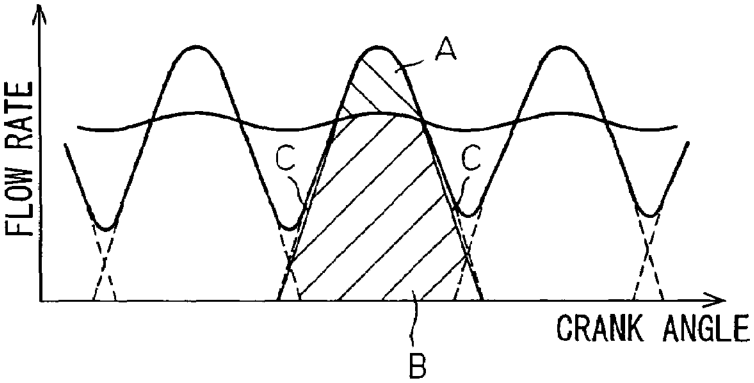

In equation (12), the term including ΔPmdwn expresses the amount of gas corresponding to the area A in FIG. 10B, the term including mt expresses the amount of gas corresponding to the area B in FIG. 10B, and the cylinder air charge amount Mci to the i-th cylinder becomes the value of the area A and area B in FIG. 10B added together. As will be understood from FIG. 10A, by finding the amount of gas other than the amount of gas corresponding to the area A in FIG. 10B as a plateau, it is possible to include the majority of the amount of gas corresponding to the area C shown in FIG. 9 in the cylinder air charge amount. Therefore, according to this embodiment, the cylinder air charge amount Mci becomes a value more accurately expressing the amount of gas charged in the combustion chamber 5 of the i-th cylinder during the opening period of the intake valve 6 of the i-th cylinder and it is possible to keep the estimation error of the cylinder air charge amount Mci small even when the opening timings of the intake valves 6 of the cylinders overlap.

Note that the control device of the fourth embodiment can be combined with the control device of not only with the first embodiment, but also the second embodiment so as to find the average cylinder air charge amount.

Next, the control device of an internal combustion engine of the fifth embodiment of the present invention will be explained. The control device of the fifth embodiment is basically the same as the control device of the first embodiment. However, when the engine speed, phase angle of the intake valve, air pressure in intake pipe, or other operating parameters of the internal combustion engine are the same, the cylinder air charge amount Mci to the i-th cylinder is determined unambiguously by the operating angle of the intake valve 6 of the i-th cylinder. For example, when fixing the operating parameters other than the operating angle, the relationship between the cylinder air charge amount Mci and the actual operating angle becomes the curve shown in FIG. 11. Therefore, in the state fixing the operating parameters other than the operating angle to specific values or values near them, it is possible to estimate the actual operating angle of the intake valve 6 of the i-th cylinder based on the map shown in FIG. 11 from the cylinder air charge amount Mci to the i-th cylinder estimated by the procedure in the first embodiment to the third embodiment (hereinafter referred to as the "air estimation procedure").

Figure 11:
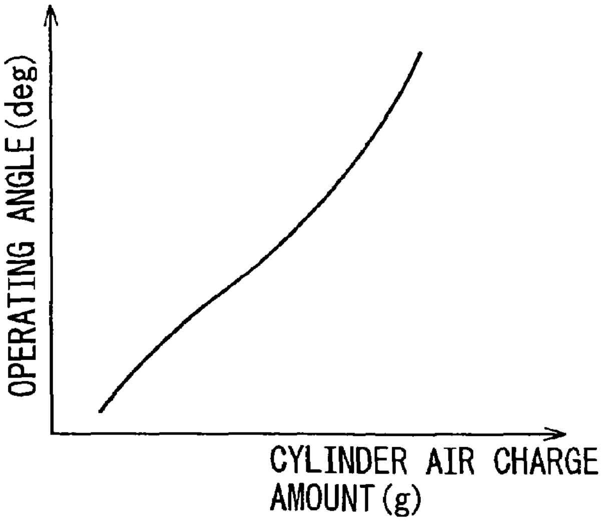
FIG. 11 is a view of the relationship between the cylinder air charge amount and operating angle.

Specifically, in the present embodiment, the curve such as shown in FIG. 11 between the cylinder air charge amount and operating angle when making the operating parameters other than the operating angle (for example, engine speed, phase angle of intake valve 6, average of air pressure in intake pipe) specific values or values near them is found in advance by experiments or calculation and stored as a map as shown in FIG. 11 in the ROM 34 of the ECU 31. Further, when the operating parameters other than the operating angle take the specific values or values near them during operation of the internal combustion engine, the cylinder air charge amount Mci to each cylinder is estimated by the above air estimation procedure. The actual operating angle of each intake valve 6 is calculated from the cylinder air charge amount Mci to each cylinder estimated and the map stored in the ROM 34. Due to this, according to the present embodiment, it is possible to calculate the actual operating angle of an intake valve 6 relatively accurately.

However, when an electromagnetic variable valve mechanism (not shown) is provided for driving an intake valve 6, deviation ends up occurring between the target operating angle instructed from the ECU 31 to the variable valve mechanism and the actual operating angle of the intake valve 6 due to deterioration of the springs etc. used in the variable valve mechanism. Further, when an intake valve 6 is driven by a mechanical variable valve mechanism, wear of the cams used for the variable valve mechanism etc. causes deviation between the target operating angle instructed from the ECU 31 to the variable valve mechanism and the actual operating angle of an intake valve 6. If such deviation occurs, the operating angle of the intake valve 6 will no longer be able to be suitably controlled and deterioration of the engine output, fuel consumption, or emission properties will end up being invited.

Therefore, in the present embodiment, when the actual operating angle estimated based on the air estimation procedure differs from the target operating angle instructed from the ECU 31 to the variable valve mechanism, correction is performed to compensate for the difference between the estimated actual operating angle and the target operating angle, whereby the actual operating angle of the intake valve 6 is made to constantly match the target operating angle.

For example, when the estimated actual operating angle and target operating angle differ, the difference of the two is calculated. Further, the target operating angle plus the calculated difference is instructed from the ECU 31 to the variable valve mechanism from the next time on.

Therefore, according to the fifth embodiment, by controlling the actual operating angle of an intake valve 6 so as to constantly match the target operating angle, it is possible to suppress deterioration of the engine output, fuel consumption, or emission properties.

Next, a control device of an internal combustion engine of a sixth embodiment of the present invention will be explained. The control device of an internal combustion engine of the sixth embodiment is basically the same as the first embodiment.

However, in the first embodiment to the third embodiment, the cylinder air charge amount estimated by the air estimation procedure based on the output from the intake pipe pressure sensor 40 is the amount of one cycle before. That is, in these embodiments, the fuel injection amount etc. are calculated based on the cylinder air charge amount of one cycle before. This is because the cylinder air charge amount is estimated after the intake gas is completely charged in the cylinder, so it is not possible to determine the fuel injection amount etc. based on the cylinder air charge amount in the same cycle as estimation of the cylinder air charge amount. Therefore, in the first embodiment to the third embodiment, only when the fluctuation of the cylinder air charge amount among cycles is small or almost nonexistent, that is, when the engine operating state is the steady state, is it possible to determine the fuel injection amount etc. based on the calculated cylinder air charge amount. However, when the engine operating state is a transient state and the cylinder air charge amount ends up fluctuating greatly among cycles, it is not possible to utilize the cylinder air charge amount estimated by the air estimation procedure in the first embodiment to the third embodiment. When the engine operating state is a transient state, it is necessary to predict the next cylinder air charge amount.

For such prediction, for example, the later explained cylinder air charge model M10 is used. In this cylinder air charge model M10, as explained later, it is possible to predict the cylinder air charge amount for the next cycle (hereinafter referred to as the "future cylinder air charge amount"), but the calculated cylinder air charge amount is not the amount of air for each cylinder, but the average of the cylinder air charge amounts for all cylinders (hereinafter referred to as the "future average cylinder air charge amount Mc'").

Therefore, in the present embodiment, the future average cylinder air charge amount Mc' calculated by the later explained cylinder air charge model M10 is corrected to calculate the future cylinder air charge amount Mci' for each cylinder.

Specifically, the average value of the cylinder air charge amounts estimated by the air estimation procedure in the first embodiment to the third embodiment for all cylinders is calculated and the error in the cylinder air charge amount of each cylinder with respect to the average value for all cylinders is calculated as the correction coefficient ηi. That is, the correction coefficient ηi for the i-th cylinder, as shown in equation (13), is the cylinder air charge amount Mci of the i-th cylinder estimated by the above air estimation procedure divided by the average value of the cylinder air charge amounts for all cylinders.

$$\eta i = \frac{Mci}{\Sigma Mci / Ncyl} \tag{13}$$

Note that in equation (13), Ncyl is the number of cylinders. Further, ΣMci is the total cylinder air charge amount to all cylinders in one cycle and is the total of the cylinder air charge amounts Mci estimated by the air estimation procedure over one cycle.

Further, the future average cylinder air charge amount Mc' calculated by the later explained cylinder air charge model M10 multiplied with the correction coefficient ηi for the i-th cylinder is made the future cylinder air charge amount Mci' of the i-th cylinder (Mci'=ηi·Mc'). Due to this, it becomes possible to accurately estimate the future cylinder air charge amount Mci' for each cylinder considering variations in the cylinder air charge amount among cylinders and is possible to maintain the air-fuel ratio of the air-fuel mixture in each cylinder at the target air-fuel ratio even when the engine operating state is a transient state. Note that the correction coefficient ηi is sequentially updated when the engine operating state is the steady state and is left as the last updated value in the immediately preceding steady state when the engine operating state is a transient state. This is due to the low estimation precision of the cylinder air charge amount in the transient state in the first embodiment to the third embodiment.

Note that in the sixth embodiment, it is also possible to make the correction coefficient ηi for the i-th cylinder the average value or the weighted average value of the correction coefficient among a plurality of cycles. For example, the weighted average value ηiave of the correction coefficient is calculated by equation (14):

$$\eta iave = s\cdot\eta i_{(n)} + (1-s)\cdot\eta i_{(n-1)} \quad (14)$$

Here, ηi(n) is the correction coefficient calculated by equation (13) at the current cycle, while ηi(n−1) is the correction coefficient calculated by equation (13) at the previous cycle. Further, s is the weight of the weighted average and is a predetermined value satisfying $0 \leqq s \leqq 1$. By using an average value or weighted average value of the correction coefficient in this way, it is possible to compensate for error arising due to noise etc. of the intake pipe pressure sensor 40.

Figure 12:
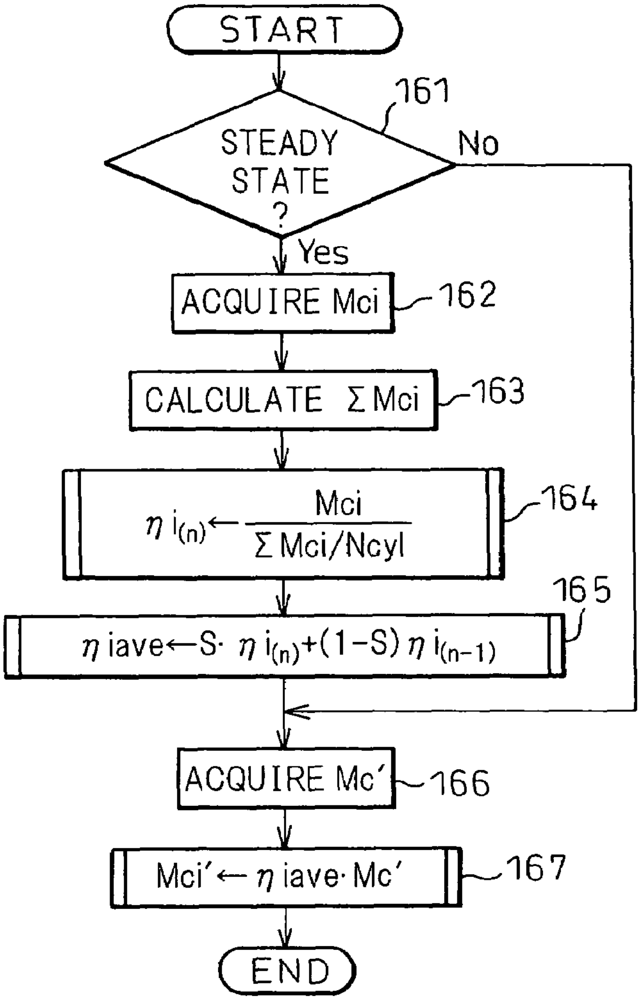
FIG. 12 is a flow chart of the routine of the procedure for estimating a future cylinder air charge amount Mci' of an i-th cylinder.

FIG. 12 shows the routine of the procedure for estimating the future cylinder air charge amount Mci' of the i-th cylinder. This procedure is performed for each cylinder. First, at step 161, it is judged if the current engine operating state is the steady state. It is judged that the engine operating state is the steady state when for example the engine speed, engine load, and other operating parameters are within predetermined ranges for a certain period. When it is judged that the engine operating state is not the steady state, steps 162 to 165 are not executed. When it is judged that the engine operating state is the steady state, the routine proceeds to step 162.

At steps 162 to 165, the correction coefficient ηiave is updated. At step 162, the cylinder air charge amount Mci to the i-th cylinder is estimated by the above air estimation procedure. Next, at step 163, the cylinder air charge amount Mci to the i-th cylinder calculated at step 162 is added, whereby the total cylinder air charge amount ΣMci to all cylinders during one cycle is calculated. Next, at step 164, the correction coefficient ηi for the i-th cylinder is calculated by equation (13) from the Mci estimated at step 162 and the ΣMci calculated at step 163. At step 165, the weighted average value ηiave for the i-th cylinder is calculated by equation (14) based on the correction coefficients ηi calculated at the current and previous step 164.

Next, at step 166, the future average cylinder air charge amount Mc' calculated by the cylinder air charge model M10 is obtained. Further, at step 167, the weighted average value ηiave of the correction coefficient calculated at step 165 is multiplied with the future average cylinder air charge amount Mc' to obtain the future cylinder air charge amount Mci' for the i-th cylinder (Mci'=ηiave·Mc').

Next, a control device for an internal combustion engine of a seventh embodiment of the present invention will be explained. The control device of the seventh embodiment is basically similar to the control device of the sixth embodiment, but in the sixth embodiment, the future average cylinder air charge amount Mc' calculated by the later explained cylinder air charge model M10 was multiplied by the correction coefficient ηi for each cylinder, while in the present embodiment, the correction gas amount ΔMi for each cylinder is added to the future average cylinder air charge amount Mc' so as to calculate the future cylinder air charge amount Mci' for each cylinder (Mci'=Mc'+ΔMi).

Here, the method of calculation of the correction gas amount ΔMi will be explained. The error of the cylinder air charge amount of each cylinder with respect to the average cylinder air charge amount changes depending on the values of the operating parameters of the internal combustion engine (for example, the operating angle, engine speed, and phase angle). For example, taking the operating angle as an example, for the same cylinder, the error is small when the operating angle is large, while when the operating angle is small, the error is large. The correction gas amount ΔMi is for compensating for this error, thus it is necessary to set it to become the same value as this error. Therefore, the relationship between the operating angle VL and the correction gas amount ΔMi is one where, as shown in FIG. 13, the correction gas amount has to be set small when the operating angle VL is large and the correction gas amount has to be set large when the operating angle is small.

Further, the relationship between the operating angle VL and the above error differs depending on the cylinders and extent of aging. Therefore, similarly, the relationship between the operating angle VL and the correction gas amount ΔMi also becomes various relationships depending on the cylinders and the aging such as shown by o, p, and q in FIG. 13.

Therefore, in the present embodiment, first, the relationship between the operating angle VL and the correction gas amount ΔMi is found in advance by experiments and stored as a map in the ROM 34 of the ECU 31. Further, the operating angle VL at the time of certain detection conditions and the cylinder air charge amount Mci to the i-th cylinder at that time are estimated by the air estimation procedure of the first embodiment to the third embodiment. Further, the cylinder air charge amount Mci to the i-th cylinder estimated is reduced by the future average cylinder air charge amount Mc' calculated by the cylinder air charge model M10 at that cycle so as to calculate the correction gas amount ΔMi under the above certain detection conditions. For example, when the correction gas amount calculated when the operating angle is VL1 is ΔMi1, as shown in FIG. 13, this point is on the curve o. Therefore, the curve o is adopted as the curve of the correction gas amount for the i-th cylinder.

Figure 13:
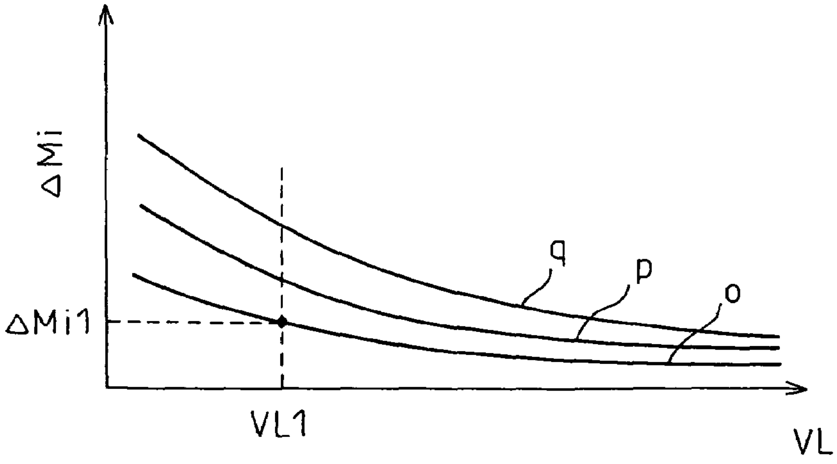
FIG. 13 is a view of the relationship between the operating angle and a correction gas amount ΔMi.

Further, in the next cycle on, at the i-th cylinder, the correction gas amount ΔMi is calculated from the map shown in FIG. 13 based on the operating angle VL for each cycle. The future cylinder air charge amount Mci' to the i-th cylinder is made the average cylinder air charge amount Mc' plus the above correction gas amount ΔMi (Mci'=Mc'+ΔMi).

This procedure is performed for each cylinder. Due to this, it is possible to compensate for variations in the cylinder air charge amount among cylinders and accurately calculate for future cylinder air charge amount Mci' for each cylinder.

Next, the cylinder air charge model M10 will be explained. Note that below the average cylinder air charge amount calculated by the cylinder air charge model M10 will be designated as Mc' and the average cylinder air intake flow rate as mc'.

Figure 14:
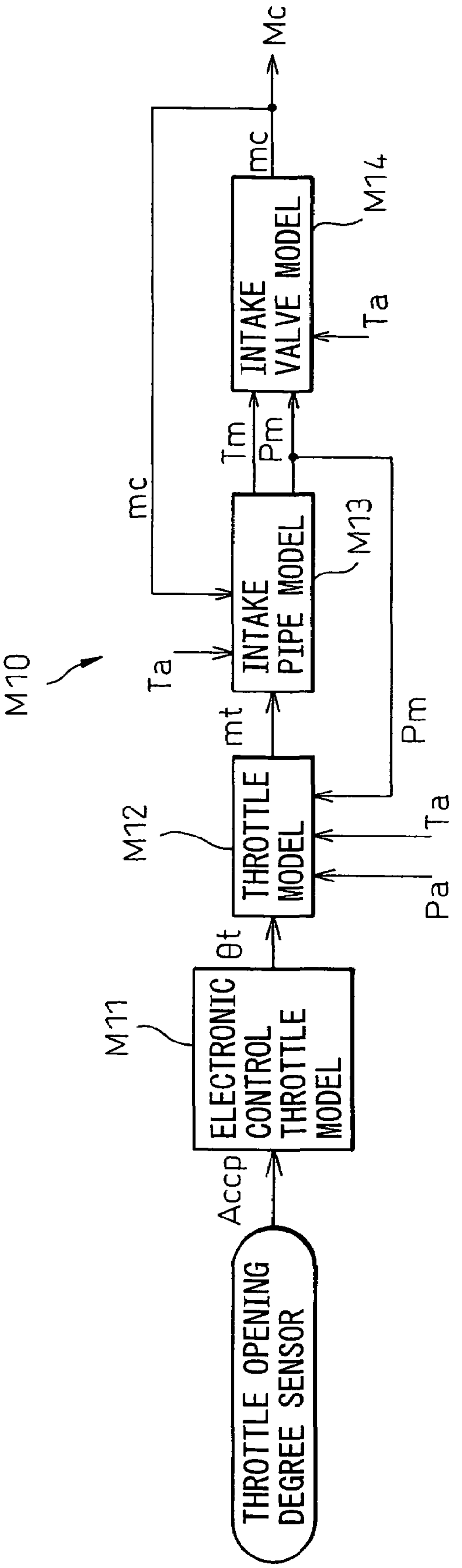
FIG. 14 is a view of an intake gas model used in the present invention.

The cylinder air charge model M10, as shown in FIG. 14, is provided with an electronic control throttle model M11, a throttle model M12, an intake pipe model M13, and an intake valve model M14. The electronic control throttle model M11 receives as input the accelerator pedal operation amount Accp detected by the load sensor 46 and outputs the throttle opening degree θt which the actual throttle valve 18 reaches after the predetermined time ΔT (hereinafter referred to as the "forecasted throttle opening degree"). The throttle model M12 receives as input the forecasted throttle opening degree θt output from the electronic control throttle model M11, the atmospheric pressure Pa around the internal combustion engine detected by the atmospheric pressure sensor 44 (or the pressure of the air taken into the intake pipe 15), the atmospheric temperature Ta around the internal combustion engine detected by the atmospheric temperature sensor 43 (or the temperature of the air taken into the intake pipe 15), and the pressure Pm in the intake tube 13 calculated at the later explained intake pipe model M13 (air pressure in intake pipe). By entering the values of these input parameters into the model equation of the later explained throttle model M12, the flow rate of air passing through the throttle valve 18 per unit time (hereinafter referred to as the "throttle valve air passage flow rate mt") is calculated. The throttle valve air passage flow rate mt calculated at the throttle model M12 is input to the intake pipe model M13.

The intake pipe model M13 receives as input the throttle valve air passage flow rate mt calculated at the throttle model M12 and the flow rate of the intake gas flowing into a combustion chamber 5 per unit time, explained in detail below (hereinafter referred to as the "average cylinder air intake flow rate mc'", the definition of the average cylinder air intake flow rate mc' being described in detail in the intake valve model M14). By entering the values of these input parameters into the model equation of the later explained intake pipe model M13, the pressure of the intake gas present in the intake tube 13 and surge tank 14 (hereinafter referred to as the "air pressure in intake pipe Pm") and the temperature of the intake gas present in the intake tube 13 and surge tank 14 (hereinafter referred to as the "air temperature in intake pipe Tm") are calculated. The air pressure in intake pipe Pm and air temperature in intake pipe Tm calculated at the intake pipe model M13 are both input to the intake valve model M14. Further, the air pressure in intake pipe Pm is also input to the throttle model M12.

The intake valve model M14 receives as input the atmospheric temperature Ta in addition to the air pressure in intake pipe Pm and air temperature in intake pipe Tm calculated in the intake pipe model M13. By entering the values of these input parameters into the model equation of the later explained intake valve model M14, the average cylinder air intake flow rate mc' is calculated. The calculated average cylinder air intake flow rate mc' is converted to the average cylinder air charge amount Mc'. Based on this average cylinder air charge amount Mc', the fuel injection amount from a fuel injector is determined. Further, the average cylinder air intake flow rate mc' calculated at the intake pipe model M13 is input to the intake pipe model M13.

As will be understood from FIG. 14, in the cylinder air charge model M10, since the values of parameters calculated at certain models are utilized as the input values to other model, in the cylinder air charge model M10 as a whole, the only actually input values are the three parameters of the throttle opening degree θt, the atmospheric pressure Pa, and the atmospheric temperature Ta. Therefore, the average cylinder air charge amount Mc' is calculated from these three parameters.

Next, the models M11 to M14 of the cylinder air charge model M10 will be explained.

Figure 15:
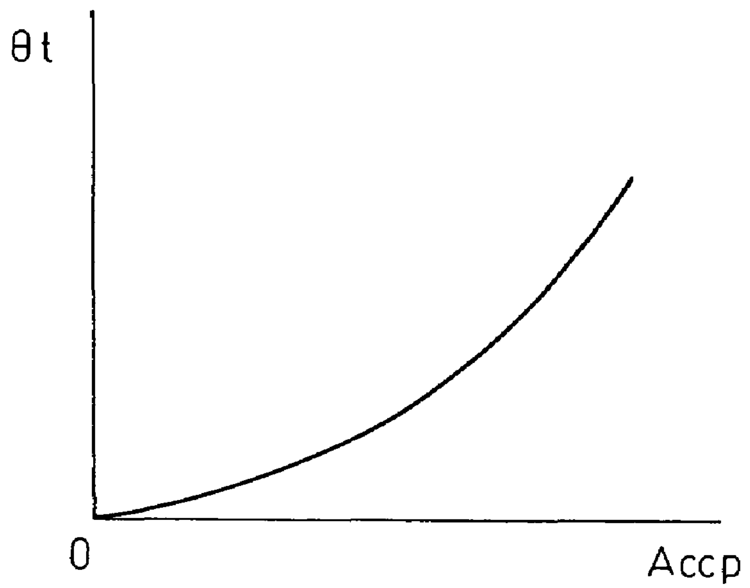
FIG. 15 is a view of the relationship between an amount of accelerator depression and target throttle opening degree.

The electronic control throttle model M11 is a model for estimating the actual throttle opening degree θt reached by the throttle valve 18 after a predetermined time ΔT (hereinafter referred to as the "forecasted throttle opening degree") based on the accelerator pedal operation amount Accp detected by the load sensor 46. In this embodiment, by the throttle valve electronic control logic, the throttle opening degree θt is found based on the accelerator pedal operation amount Accp detected by the load sensor 46 and the map defining the relationship between the accelerator pedal operation amount Accp and target throttle opening degree θt shown in FIG. 15. The thus found throttle opening degree θt is sent to the throttle model M12. On the other hand, a value of the throttle opening degree θt delayed by exactly a predetermined time ΔT (for example 64 msec) is found as the final target throttle opening degree θr and a drive signal is sent to the step motor 17 so that the actual throttle opening degree TA becomes the target throttle opening degree θr.

In this way, the target throttle opening degree θr is equal to the throttle opening degree θt determined in accordance with the accelerator pedal operation amount Accp at a time exactly a predetermined time ΔT before the current time. The throttle valve 18 is driven based on the target throttle opening degree θr, so the throttle opening degree θt becomes a throttle opening degree exactly ΔT earlier than the throttle opening degree of the actual throttle valve 18. Conversely, the throttle opening degree θt becomes a throttle opening degree which the actual throttle valve 18 reaches after a predetermined time ΔT.

Figure 16:
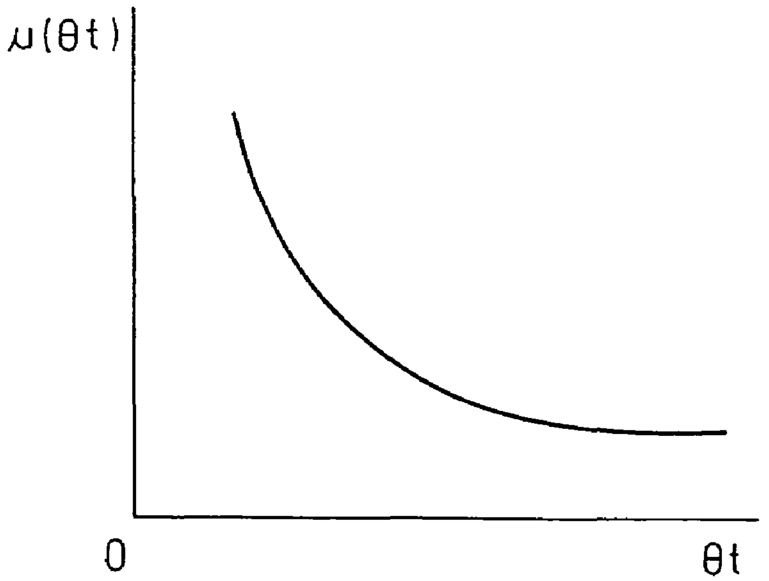
FIG. 16 is a view of the relationship of a throttle valve opening degree and flow coefficient.
Figure 17:
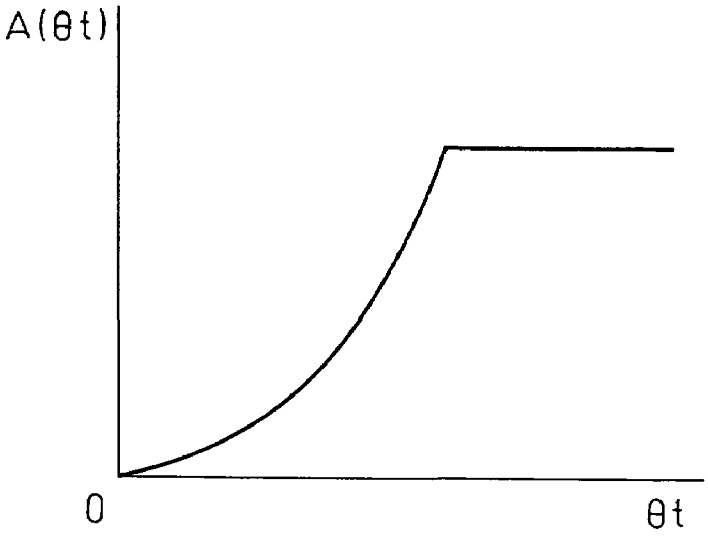
FIG. 17 is a view of the relationship of a throttle valve opening degree and opening area.

In the throttle model M12, the throttle valve air passage flow rate mt is calculated from the atmospheric pressure Pa, the atmospheric temperature Ta, the air pressure in intake pipe Pm, and the forecasted throttle opening degree θt output from the electronic control throttle model M11, based on the following equation (15). Here, $\mu$ in equation (15) is the flow coefficient in a throttle valve, is a function of the throttle valve opening degree θt, and is determined from a map as shown in FIG. 16. Further, At indicates the cross-sectional area of the opening of the throttle valve, is a function of the throttle valve opening degree θt, and is determined from a map such as shown in FIG. 17. Note that $\mu\cdot$At combining the flow coefficient $\mu$ and the throttle opening area At may also be found by one map from the throttle valve opening degree θt. Further, Ra is a constant relating to the gas constant and actually is the gas constant divided by the mass $M_{1mol}$ of the gas (air) per mol.

$$mt = \mu \cdot At \cdot \frac{Pa}{\sqrt{Ra \cdot Ta}} \cdot \Phi\left(\frac{Pm}{Pa}\right) \tag{15}$$

Figure 18:
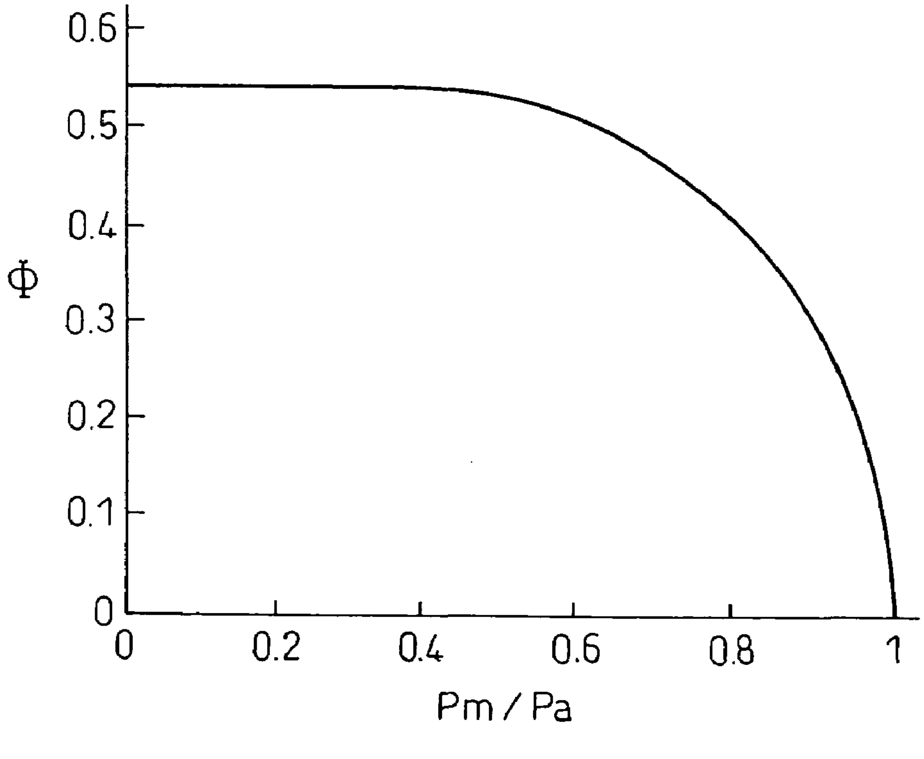
FIG. 18 is a view of the function Φ (Pm/Pa)

Φ (Pm/Pa) is a function shown in the following equation (16). The κ in equation (16) is the ratio of specific heat (made a constant value). This function Φ (Pm/Pa) can be expressed as a graph such as shown in FIG. 18, so it is possible to store this graph in the ROM of the ECU 31 as a map and not only use equation (16) for calculation, but also find the value of Φ (Pm/Pa) from the map.

$$\Phi\left(\frac{Pm}{Pa}\right) = \begin{cases} \sqrt{\frac{\kappa}{2(\kappa+1)}} & \cdots \frac{Pm}{Pa} \le \frac{1}{\kappa+1} \\ \sqrt{\left\{\left(\frac{\kappa-1}{2\kappa}\right)\cdot\left(1-\frac{Pm}{Pa}\right)+\frac{Pm}{Pa}\right\}\cdot\left(1-\frac{Pm}{Pa}\right)} & \cdots \frac{Pm}{Pa} > \frac{1}{\kappa+1} \end{cases} \tag{16}$$

Equation (15) to equation (16) of the throttle model M12 are obtained making the pressure of the gas upstream of the throttle valve 18 the atmospheric pressure Pa, making the temperature of the gas upstream of the throttle valve 18 the atmospheric temperature Ta, and making the pressure of the gas downstream of the throttle valve 18 the air pressure in intake pipe Pm, applying the law of the conservation of mass, the law of the conservation of energy, and the law of the conservation of motion to the model of the throttle valve 18 as shown in FIG. 19, and utilizing the gas state equation, definition of the ratio of specific heat, and Meyer's relation.

In the intake pipe model M13, the air pressure in intake pipe Pm and the air temperature in intake pipe Tm are calculated from the throttle valve air passage flow rate mt, the average cylinder intake air flow rate mc', and the atmospheric temperature Ta based on the following equation (17) and equation (18). Here, Vm in equation (17) and equation (18) is a constant equal to the volume of the part of the intake pipe 13 from the throttle valve 18 to the intake valve 6 (hereinafter called the "intake pipe part").

$$\frac{d}{dt}\left(\frac{Pm}{Tm}\right)=\frac{R}{Vm}\cdot(mt-mc) \tag{17}$$

$$\frac{dPm}{dt}=\kappa\cdot\frac{Ra}{Vm}\cdot(mt\cdot Ta-mc\cdot Tm) \tag{18}$$

Here, the intake pipe model M13 will be explained with reference to FIG. 20. If the total amount of gas of the intake pipe part (total amount of intake gas) is made M, the change over time of the total amount of gas M becomes equal to the difference between the flow rate of the gas flowing into the intake pipe part, that is, the throttle valve air passage flow rate mt, and the flow rate of the gas flowing out of the intake pipe part, that is, the average cylinder intake air flow rate mc', so due to the law of the conservation of mass, equation (19) is obtained. From this equation (19) and the gas state equation (Pm·Vm=M·R·Tm), equation (17) is obtained.

$$\frac{dM}{dt}=mt-mc \tag{19}$$

Further, the change over time of the energy of gas M·Cv·Tm of the intake pipe part is equal to the difference between the energy of the gas flowing into the intake pipe part and the energy of the gas flowing out from the intake pipe part. Therefore, if making the temperature of the gas flowing into the intake pipe part the atmospheric temperature Ta and making the temperature of the gas flowing out from the intake pipe part the air temperature in intake pipe Tm, the following equation (20) is obtained from the law of the conservation of energy and equation (18) is obtained from equation (20) and the gas state equation.

$$\frac{d(M\cdot Cv\cdot Tm)}{dt}=Cp\cdot mt\cdot Ta-Cp\cdot mc\cdot Tm \tag{20}$$

In the intake valve model M14, the average cylinder intake air flow rate mc' is calculated from the air pressure in intake pipe Pm, the air temperature in intake pipe Tm, and the atmospheric temperature Ta based on the following equation (21). Note that a and b in equation (21) are values determined from the engine speed NE and further, in the case of an internal combustion engine provided with variable valve mechanisms enabling change of the phase angle (valve timing) and operating angle of the intake valve 6, the phase angle and operating angle of the intake valve 6.

$$mc=\frac{Ta}{Tm}\cdot(a\cdot Pm-b) \tag{21}$$

Figure 21:
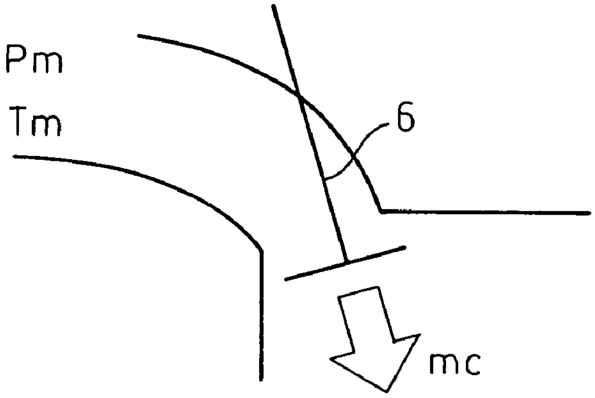
FIG. 21 is a view of the basic concept of an intake valve model.

The above-mentioned intake valve model M14 will be explained next referring to FIG. 21. In general, the average cylinder air charge amount Mc' showing the amount of intake air sucked into the combustion chamber 5 at the time the intake valve 6 is closed is finally set at the time the intake valve 6 is closed (when intake valve is closed) and is proportional to the pressure in the combustion chamber 5 at the time the intake valve is closed. Further, the pressure inside the combustion chamber 5 at the time the intake valve is closed can be deemed as equal to the pressure of the gas upstream of the intake valve, that is, the air pressure in intake pipe Pm. Therefore, the average cylinder air charge amount Mc' can be approximated as being proportional to the air pressure in intake pipe Pm.

Here, if making the average of the total amounts of air flowing out from the intake pipe part per unit time or the average of the amounts of air flowing from the intake pipe part to all combustion chambers 5 per unit time across the intake stroke of one cylinder (as explained later, in this embodiment, a 180° amount of crank angle) the average cylinder intake air flow rate mc' (explained in detail below), since the average cylinder air charge amount Mc' is proportional to the air pressure in intake pipe Pm, the average cylinder intake air flow rate mc' can also be considered to be proportional to the air pressure in intake pipe Pm. From this, the above equation (21) is obtained based on theory and experience. Note that the value a in equation (21) is a proportional coefficient and is determined from a three-dimensional map using the engine speed Ne, lift instruction value VL of the intake valve 6, and phase angle instruction value VT of the intake valve 6 as parameters. Note that three-dimensional map is found in advance by experiments or by calculation and is stored in the ROM 34 of the ECU 31. The value b is a value showing the burned gas remaining in a combustion chamber 5 (considered to be the amount of burned gas remaining in the combustion chamber 5 at the time of the exhaust valve 8 is closed divided by the later explained time $\Delta T_{180°}$). Further, during actual operation, sometimes the air temperature in intake pipe Tm will change greatly at a transient time, so to correct this, the value Ta/Tm is multiplied with based on theory and experience.

Figure 22:
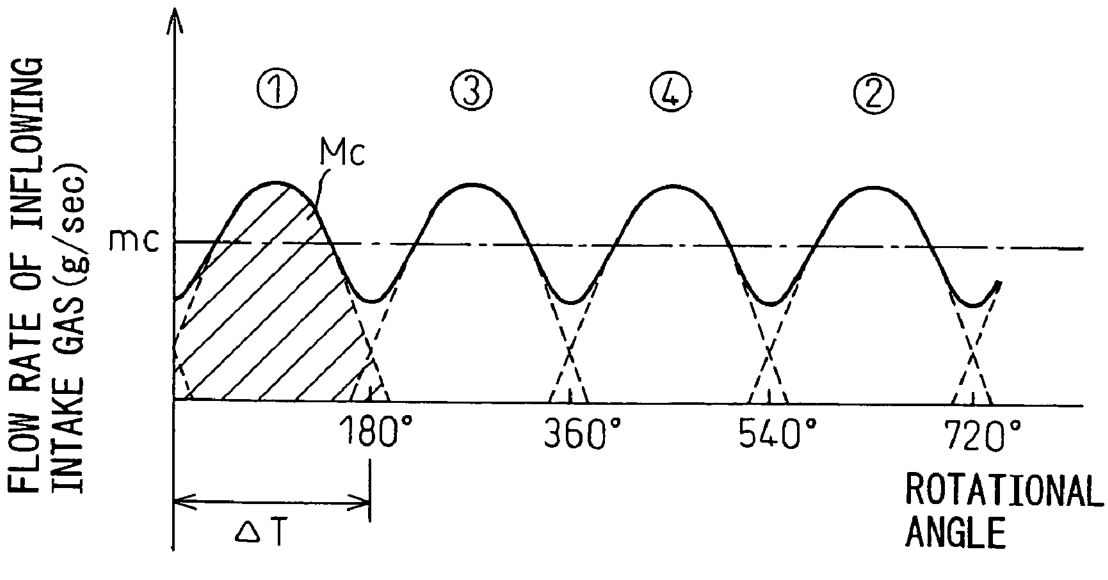
FIG. 22 is a view relating to the definitions of the cylinder air charge amount and cylinder intake air flow rate.

Here, the average cylinder intake air flow rate mc' will be explained with reference to FIG. 22 for the case where the internal combustion engine has four cylinders. Note that in FIG. 22, the abscissa is the rotational angle of the crankshaft, while the ordinate is the flow rate of intake air actually flowing from the intake pipe part to a combustion chamber 5 per unit time. As shown in FIG. 22, in a four-cylinder internal combustion engine, the intake valves 6 for example open in the order of the #1 cylinder, #3 cylinder, #4 cylinder, and #2 cylinder. Intake gas flows from the intake pipe part to the combustion chamber 5 of each cylinder depending on the degree of opening of the intake valve 6 corresponding to each cylinder. For example, the flow rate of the intake gas flowing from the intake pipe part to the combustion chamber of each cylinder changes as shown by the broken line in FIG. 22. The flow rate of the intake gas flowing from the intake pipe part into the combustion chambers of all cylinders combining these is as shown by the solid line in FIG. 22.

Further, the average cylinder air charge amount Mc' to the #1 cylinder corresponds to the part shown by hatching in FIG. 22.

As opposed to this, the average of the amounts of air flowing from the intake pipe part into the combustion chambers of all of the cylinders shown by the solid line is the average cylinder intake air flow rate mc' and is shown by the chain line in the figure. Further, the average cylinder intake air flow rate mc' shown by the chain line multiplied with the time $\Delta T_{180}°$ required for the crankshaft to rotate 180° in the case of four cylinders (that is, in a four-stroke type internal combustion engine, the angle 720° of rotation of the crankshaft in one cycle divided by the number of cylinders) becomes the average cylinder air charge amount Mc'. Therefore, by multiplying the average cylinder intake air flow rate mc' calculated by the intake valve model M14 with $\Delta T_{180°}$ it is possible to calculate the average cylinder air charge amount Mc' ($Mc'=mc'\cdot\Delta T_{180°}$). Considering the fact that the average cylinder air charge amount Mc' is proportional to the pressure at the time of intake valve closing, the average cylinder intake air flow rate mc' at the time of intake valve closing multiplied with the $\Delta T_{180°}$ is made the average cylinder air charge amount Mc'.

Next, the case of loading the cylinder air charge model M10 in the control device of the internal combustion engine and actually calculating the average cylinder air charge amount Mc' will be explained. The average cylinder air charge amount Mc' is expressed by solving the above equation (15), equation (17), equation (18), and equation (21). In this case, for processing by the ECU 31, these equations must be made discrete. If making equation (15), equation (17), equation (18), and equation (21) discrete using the time t and the calculation interval Δt, equation (22), equation (23), equation (24), and equation (25) are obtained. Note that the air temperature in intake pipe Tm(t+Δt) is calculated by equation (26) from the Pm/Tm (t+Δt) and Pm(t+Δt) calculated from equation (23) and equation (24).

$$mt(t) = \mu \cdot At(\theta t(t)) \cdot \frac{Pa}{\sqrt{R \cdot Ta}} \Phi\left(\frac{Pm(t)}{Pa}\right) \tag{22}$$

$$\frac{Pm}{Tm}(t+\Delta t) = \frac{Pm}{Tm}(t) + \Delta t \cdot \frac{R}{Vm} \cdot (mt(t) - mc(t)) \tag{23}$$

$$Pm(t+\Delta t) = Pm(t) + \Delta t \cdot \kappa \cdot \frac{R}{Vm} \cdot (mt(t) \cdot Ta - mc(t) \cdot Tm(t)) \tag{24}$$

$$mc(t) = \frac{Ta}{Tm(t)} \cdot (a \cdot Pm(t) - b) \tag{25}$$

$$Tm(t+\Delta t) = \frac{Pm(t+\Delta t)}{\frac{Pm}{Tm}(t+\Delta t)} \tag{26}$$

In the this loaded cylinder air charge model M10, the throttle valve air passage flow rate mt(t) at the time t calculated by equation (22) of the throttle model M12 and the average cylinder air intake flow rate mc'(t) at the time t calculated by equation (25) of the intake valve model M14 are entered into equation (23) and equation (24) of the intake pipe model M13, whereby the air pressure in intake pipe Pm(t+Δt) and the air temperature in intake pipe Tm(t+Δt) at the time t+Δt are calculated. Next, the calculated Pm(t+Δt) and Tm(t+Δt) are entered into equation (22) and equation (25) of the throttle model M12 and the intake valve model M14, whereby the throttle valve air passage flow rate mt(t+Δt) and average cylinder air intake flow rate mc'(t+Δt) at the time t+Δt are calculated. Further, by repeating this calculation, the average cylinder air intake flow rate mc' at any time t is calculated from the forecasted throttle opening degree θt, atmospheric pressure Pa, and atmospheric temperature Ta. By multiplying the calculated average cylinder air intake flow rate mc' with the above time $\Delta T_{180°}$, the average cylinder air charge amount Mc' at any time t is calculated. In particular, since the forecasted throttle opening degree θt is a throttle opening degree earlier than the throttle opening degree of the actual throttle valve 18 by exactly ΔT, the calculated average cylinder air charge amount Mc' also becomes the future value.

Note that at the time of startup of the internal combustion engine, that is, when the time t=0, the air pressure in intake pipe Pm is considered to be equal to the atmospheric pressure (Pm(0)=Pa) and the air temperature in intake pipe Tm is considered to be equal to the atmospheric temperature (Tm(0)=Ta) in starting the calculation at the models M11 to M13.

Note that in the cylinder air charge model M10, the atmospheric temperature Ta and atmospheric pressure Pa were assumed to be constant, but they may also be values changing along with the moment. For example, it is also possible to enter the value detected at the time t by the atmospheric temperature sensor for detecting the atmospheric temperature for the atmospheric temperature Ta(t) and the value detected at the time t by the atmospheric pressure sensor for detecting the atmospheric pressure for the atmospheric pressure Pa(t) in equation (22), equation (24), and equation (25).

Note that in the present specification, "when the engine operating state is a steady state" means an operating state where the operating parameters of the internal combustion engine (for example, engine speed, engine load, and cylinder air charge amount) do not change much at all and are maintained substantially constant, while "when the engine operating state is a transient state" means an operating state where the operating parameters of the internal combustion engine fluctuate greatly.

While the invention has been described with reference to specific embodiments chosen for purpose of illustration, it should be apparent that numerous modifications could be made thereto by those skilled in the art without departing from the basic concept and scope of the invention.

What is claimed is:

1. A control device of an internal combustion engine, comprising:

throttle air passage calculating means for calculating an amount of throttle air passage through a throttle valve, excess air calculating means for calculating an amount of excess air to a cylinder corresponding to a drop in air pressure in an intake pipe occurring due to pulsation of the air pressure due to an intake valve for that cylinder opening, cylinder air charge estimating means for estimating a cylinder air charge amount for each cylinder based on the amount of throttle air passage detected by said throttle air passage detecting means and an amount of excess air calculated by said excess air calculating means, and engine control means for controlling the internal combustion engine based on the cylinder air charge amount for each cylinder estimated by said cylinder air charge estimating means.

2. A control device of an internal combustion engine as set forth in claim 1, wherein said cylinder air charge estimating means employs the total of the amount of throttle air passage and the amount of excess air to each cylinder as the cylinder air charge amount to each cylinder.

3. A control device of an internal combustion engine as set forth in claim 1, wherein said cylinder air charge estimating means employs the total of the amount of throttle air passage and the amount of excess air to each cylinder averaged for each cylinder over a plurality of cycles as the cylinder air charge amount to each cylinder.

4. A control device of an internal combustion engine as set forth in claim 1, further comprising a pressure sensor for detecting an air pressure in intake pipe, wherein said excess air calculating means calculates the amount of excess air to each cylinder using a state equation based on a difference between a maximum value and a minimum value of the air pressure in intake pipe detected by said pressure sensor during the period when the intake valve corresponding to each cylinder is opened and a period near it and on the air temperature in intake pipe.

5. A control device of an internal combustion engine as set forth in claim 4, wherein the device employs atmospheric temperature as the air temperature in intake pipe.

6. A control device of an internal combustion engine as set forth in claim 1, wherein said excess air calculating means calculates the amount of excess air to each cylinder based on a drop in the air pressure in intake pipe due to the intake valve corresponding to each cylinder opening and a rise in the air pressure in intake pipe right before the intake valve corresponding to that cylinder opens or right after that intake valve closes.

7. A control device of an internal combustion engine as set forth in claim 1, further comprising a flow rate sensor for detecting a throttle valve air passage flow rate through the throttle valve, and wherein said throttle air passage calculating means calculates the amount of throttle air passage by integrating the throttle valve air passage flow rate detected by the flow rate sensor in the period between the maximum value timing where the air pressure in intake pipe becomes maximum and the minimum value timing where the air pressure in intake pipe becomes minimum in the period where the intake valve corresponding to each cylinder opens and its nearby period.

8. A control device of an internal combustion engine as set forth in claim 1, comprising a flow rate sensor for detecting a throttle valve air passage flow rate through the throttle valve, and wherein said throttle valve air passage calculating means calculates the amount Mt of throttle air passage based on the following equation (1):

$$Mt=mt\cdot(\Delta tdwn+\Delta tioc)/2 \quad (1)$$

where

Δtdwn: period between the maximum value timing where the air pressure in intake pipe becomes maximum and the minimum value timing where the air pressure in intake pipe becomes minimum in the period where the intake valve corresponding to each cylinder opens and its nearby period;

Δtioc: period between opening timing and closing timing of intake valve;

mt: throttle valve air passage flow rate detected by flow rate sensor during these periods.

9. A control device of an internal combustion engine as set forth in claim 1, wherein said engine control means controls a fuel injection amount and ignition timing based on the cylinder air charge amount for each cylinder estimated by the cylinder air charge estimating means.

10. A control device of an internal combustion engine as set forth in claim 1, wherein said intake valve is changed in operating angle in accordance with the engine operating state, and the device stores in advance the relationship between the cylinder air charge amount and the operating angle of said intake valve in the state of a specific engine operating state, estimates an actual operating angle in each cylinder based on the cylinder air charge amount calculated by said cylinder air charge calculating means and said stored relationship, and, when said estimated actual operating angle and target operating angle differ, corrects operating parameters of the internal combustion engine so as to compensate for the difference in operating angles.

11. A control device of an internal combustion engine as set forth in claim 1, further comprising an air predicting means for predicting an average cylinder air charge amount for all cylinders based on at least the throttle opening degree and the atmospheric temperature and atmospheric pressure around the internal combustion engine, wherein said device calculates a relative error between cylinders based on the cylinder air charge amount for each cylinder estimated by said cylinder air charge estimating means when the engine operating state is a steady state, and said engine control means controls the internal combustion engine based on the cylinder air charge amount for each cylinder calculated by correcting the average cylinder air charge amount predicated by said air predicting means when the engine operating state is a transient state based on said error.

* * * * *